United States Patent
Goto

(10) Patent No.: US 7,991,207 B2
(45) Date of Patent: Aug. 2, 2011

(54) METHOD AND DEVICE FOR EXTRACTING REGION INCLUDING STRATIFIED REGION HELD BETWEEN FIRST AND SECOND CLOSED REGIONS

(75) Inventor: Yoshihiro Goto, Tokyo (JP)

(73) Assignee: Hitachi Medical Corporation, Tokyo (JP)

( * ) Notice: Subject to any disclaimer, the term of this patent is extended or adjusted under 35 U.S.C. 154(b) by 983 days.

(21) Appl. No.: 10/583,420

(22) PCT Filed: Dec. 16, 2004

(86) PCT No.: PCT/JP2004/018796
§ 371 (c)(1),
(2), (4) Date: Jun. 14, 2006

(87) PCT Pub. No.: WO2005/058165
PCT Pub. Date: Jun. 30, 2005

(65) Prior Publication Data
US 2007/0165952 A1    Jul. 19, 2007

(30) Foreign Application Priority Data
Dec. 16, 2003  (JP) .................. 2003-417842

(51) Int. Cl.
*G06K 9/00* (2006.01)
(52) U.S. Cl. ........ 382/128; 382/131; 382/132; 382/173; 382/190; 345/441; 345/634; 600/481
(58) Field of Classification Search .......... 382/128–134, 382/154; 128/922; 600/410, 520
See application file for complete search history.

(56) References Cited

U.S. PATENT DOCUMENTS

| 4,805,127 | A | | 2/1989 | Hata et al. | |
|---|---|---|---|---|---|
| 5,107,838 | A | * | 4/1992 | Yamaguchi | 600/410 |
| 5,291,560 | A | * | 3/1994 | Daugman | 382/117 |
| 5,318,026 | A | * | 6/1994 | Pelc | 600/410 |
| 5,795,296 | A | * | 8/1998 | Pathak et al. | 600/443 |
| 6,038,466 | A | * | 3/2000 | Haselhoff | 600/410 |
| 6,154,560 | A | * | 11/2000 | Cothren et al. | 382/128 |

(Continued)

FOREIGN PATENT DOCUMENTS

JP    61-208180    9/1986

(Continued)

OTHER PUBLICATIONS

Fessler et al., "Model-based 3-D reconstruction of branching vessels" Proceedings of the Annual International Conference of the IEEE Engineering in Engineering in Medicine and Biology Society, Nov. 1989, pp. 561-562 vol. 2.*

(Continued)

*Primary Examiner* — Sath V Perungavoor
*Assistant Examiner* — Jason Heidemann
(74) *Attorney, Agent, or Firm* — Cooper & Dunham LLP

(57) ABSTRACT

A region-extraction method for extracting a contour of a desired region is provided.
The method includes: a step (a) for displaying an image; a step (b) for selecting a desired region in the image; a step (c) for selecting an element graphic corresponding at least a partial contour in a partial region in the desired region; a step (d) for approximating the contour of a part of the element image to at least a partial contour in the partial region; a step (e) for repeating the steps (c) to (d) at least twice; and a step (f) for making a first contour by combining at least a part of elements after the approximation.

16 Claims, 23 Drawing Sheets

U.S. PATENT DOCUMENTS

| | | | |
|---|---|---|---|
| 6,442,287 B1 * | 8/2002 | Jiang et al. | 382/128 |
| 7,298,878 B2 | 11/2007 | Goto | |
| 2002/0150280 A1 * | 10/2002 | Li | 382/117 |
| 2003/0006984 A1 * | 1/2003 | Gerard et al. | 345/424 |
| 2004/0125997 A1 * | 7/2004 | Jacob et al. | 382/128 |

FOREIGN PATENT DOCUMENTS

| | | |
|---|---|---|
| JP | 63-115541 | 5/1988 |
| JP | 2000-210284 | 8/2000 |
| JP | 2002-325761 | 11/2002 |
| JP | 2003-503136 | 1/2003 |
| WO | WO01/01859 A1 | 1/2001 |

OTHER PUBLICATIONS

Barequet et. al, "Piecewise-Linear Interpolation between Polygonal Slices", Proceedings of the tenth annual symposium on Computational geometry, Stony Brook, New York, 1994, pp. 93-102.*

Staib et al. Parametrically Deformable Contour Models, IEEE Computer Society Conference on Computer Vision and Pattern Recognition. San Diego, 1989, pp. 427-430.*

Staib et al. Boundary Finding with Parametrically Deformable Models, IEEE Transactions on Pattern Analysis and Machine Intelligence, vol. 14, No. 11, Nov. 1992.*

Thomas et al. "Effect of Black Blood MR Image Quality on Vessel Wall Segmentation", Magnetic Resonance in Medicine 46, pp. 299-304 (2001).*

English translation of May 9, 2008 Chinese official action in connection with counterpart Chinese application No. 200480037351.4.

Sep. 7, 2009 Japanese official action in connection with a counterpart Japanese patent application No. 2005-516332.

May 10, 2010 Japanese official action in connection with counterpart Japanese patent application.

* cited by examiner

FIG. 5
(a)
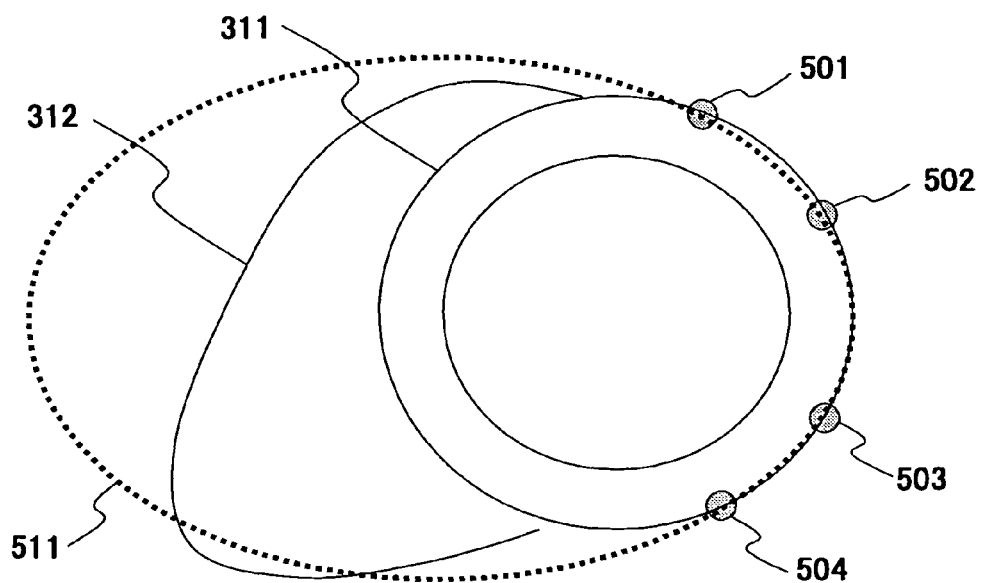
(b)
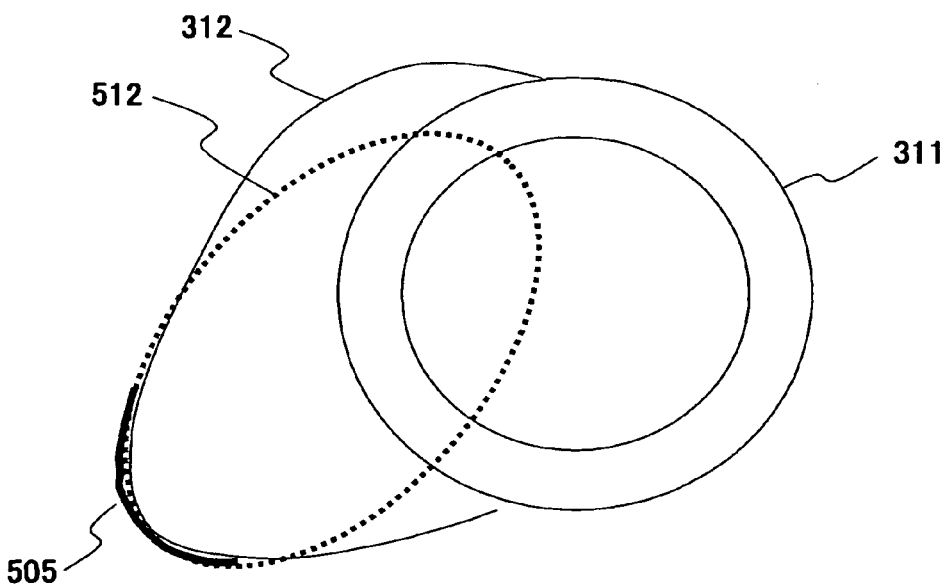

FIG. 6
(A)
(B)
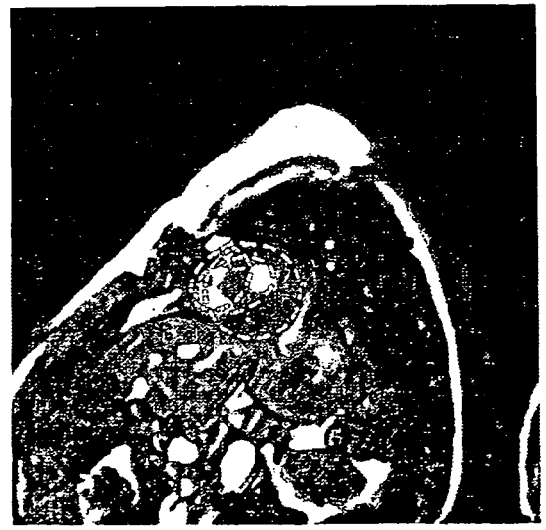
(C)

FIG. 8
(A)
(B)
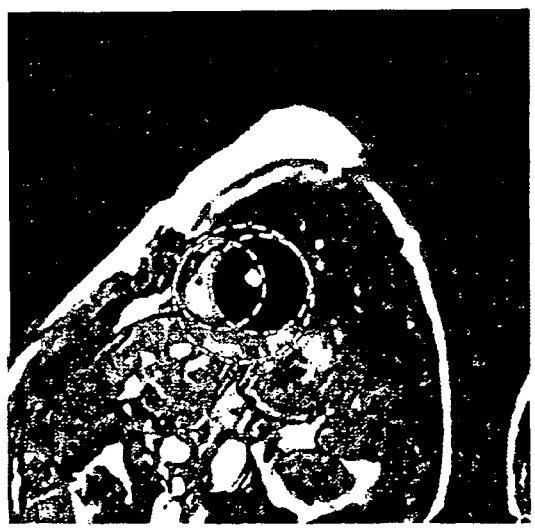
(C)

FIG. 13
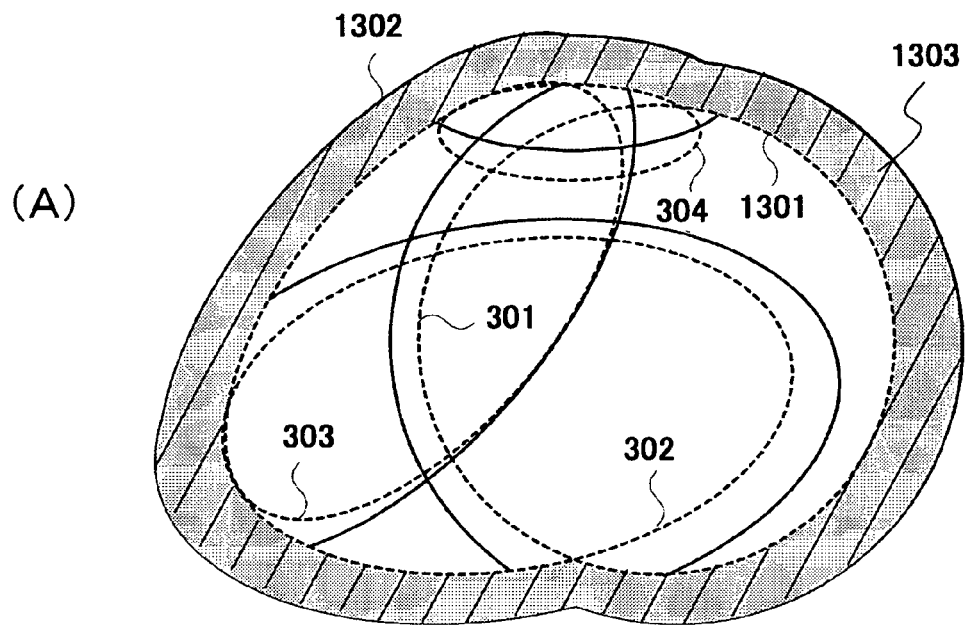
(A)
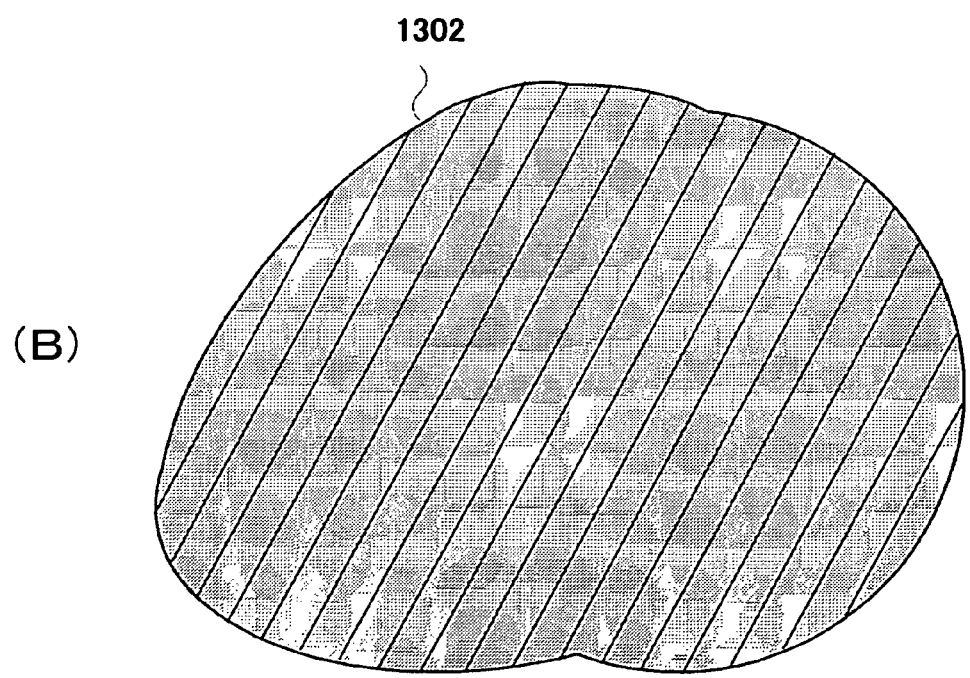
(B)

METHOD AND DEVICE FOR EXTRACTING REGION INCLUDING STRATIFIED REGION HELD BETWEEN FIRST AND SECOND CLOSED REGIONS

TECHNICAL FIELD

The present invention relates to a method and a device for extracting a specified region in an image, and in particular to a technique for extracting a region to which a desired image processing is to be applied.

BACKGROUND ART

In recent years, images being obtained with image diagnostic apparatuses such as X-ray, X-ray CT or MRI have been widely used, not only at the time of diagnosis, but also at the time of treatment. There has especially been an increase in studies for extracting automatically a specified organ out of display images for the purpose of diagnosis or treatment. For example, displaying the coronary artery pattern running in the vicinity of cardiac surface in 3-dimensional representation would be extremely useful at clinical sites.

However, in the case of segmenting the organ regions or extracting the specified regions, there is still a need for doctors to rely on their anatomical knowledge for diagnosis and recognition. Particularly, in the case of identifying an organ region, a method to approximate a simple graphic to a contour of the organ according to the anatomical knowledge of an organ to be identified is implemented. For example, as disclosed in Patent Document 1, on an ultrasonic diagnostic image, the internal volume of the left ventricle of a heart is obtained by approximating an ellipse to the contour of a left ventricle and by determining the left ventricle region.

However, the shapes of organs are generally quite complicated, thus making it difficult to precisely approximate the contours of them using a simple graphic in all cases. Approximation with a simple graphic will surely cause some errors, and the operation for the approximation would be repetitive and complicated work.

Also, the method being disclosed in Patent Document 1 relates to an elliptical internal region, and it causes a problem in the case of extracting a coronary artery located in the cardiac surface region using MIP (Maximum Intensity Projection) processing, because there are occasions upon attempting MIP processing by specifying the region encompassing the heart including the surface region that the coronary artery becomes invisible due to the high signal region of the cardiac internal region being projected.

Patent Document 1: JP-A-2000-210284

SUMMARY

In an aspect of this disclosure, there are provided a method and a device for extracting a region wherein the extraction of a specified region in the image can be executed with high accuracy by a simple operation.

In another aspect of this disclosure, there is provided a method for extracting a specified region in an image which method includes:

(a) a step for displaying an image;
(b) a step for selecting a desired region in the image;
(c) a step for selecting an element graphic to correspond with at least a partial contour of a partial region within a desired region;
(d) a step for approximating at least a partial contour of the element graphic to at least a partial contour of the partial region;
(e) a step for repeating steps (c)~(d) at least twice; and
(f) a step for making at least a partial contour of the respective element graphics after approximation as a first contour.

This is for extracting at least a partial contour of a desired region as a first contour by approximating at least a partial contour of an element graphic to at least a partial contour of a partial region within the desired region.

Also, the second contour is obtained based on the first contour, and a region including at least a stratified region that is held between the first and the second contours is extracted.

By implementing this procedure, the above-mentioned method for extracting a region can determine a contour of a desired region (the first contour) with a simple operation and with high accuracy. Further, a region including the stratified region held between at least the first contour and the second contour can be easily extracted as a specified region.

As a result, through performing a desired image processing on the specified region by the above-mentioned method for extracting the organ region, it is possible to perform an efficient and accurate image processing in a short period of time. Especially, in the case of obtaining an image of a blood vessel such as a coronary artery running on the cardiac surface region, a clear and satisfactory image can be efficiently obtained by extracting only the surface region of a heart.

In another aspect of this disclosure, there is provided a device for extracting a region, which device comprises:

a display means for displaying an image:
an input means for the indication corresponding to the image to be inputted; and
a calculating means for performing a desired image processing on the image;

wherein the display means displays a plurality of element graphics along with the image, the input means has the indication for approximating at least a partial contour of the respective element graphics inputted, and the calculating means makes a contour combining at least a partial contour of the respective element graphics after approximation as a first contour.

Also, the calculating means obtains a second contour based on the first contour, and extracts the region including the stratified region held between at least the first contour and the second contour.

These configurations are related to the device for actualizing the above-mentioned method for extracting the region, and such configured device for extracting the region would have the same effects as of the above-mentioned method.

BRIEF DESCRIPTION OF THE DRAWINGS

FIG. 5 is a diagram showing an example of placing a plurality of points or one or more curves on a part of an outer contour of a heart, and selecting an ellipse that passes through those points, curves or the vicinity of them.

FIG. 6 is a diagram showing a case of approximating the outer contour of a heart by combining four ellipses, as an example of actually approximating the heart being displayed on the actual tomographic image by a combination of the plurality of element graphics.

FIG. 8 is a diagram showing a case of approximating an outer contour of a heart by combining three ellipses that are close to a circle, as an example of actually approximating the heart being actually displayed on a tomographic image by a combination of the plurality of element graphics.

FIG. 13 is a diagram showing an example in the case of extracting the region held between the first contour (dotted line) being approximated by a combination of four ellipses (dotted lines) and the second contour (solid line) which is larger than the first line as a stratified region, and an example in the case of extracting the compacted region being obtained by making all of the inside of the second contour a constant value.

BEST MODE FOR CARRYING OUT THE INVENTION

The First Embodiment

Hereinafter, the first embodiment of a device and method for extracting regions related to the present invention will be described referring to the attached drawings.

Figure 23:
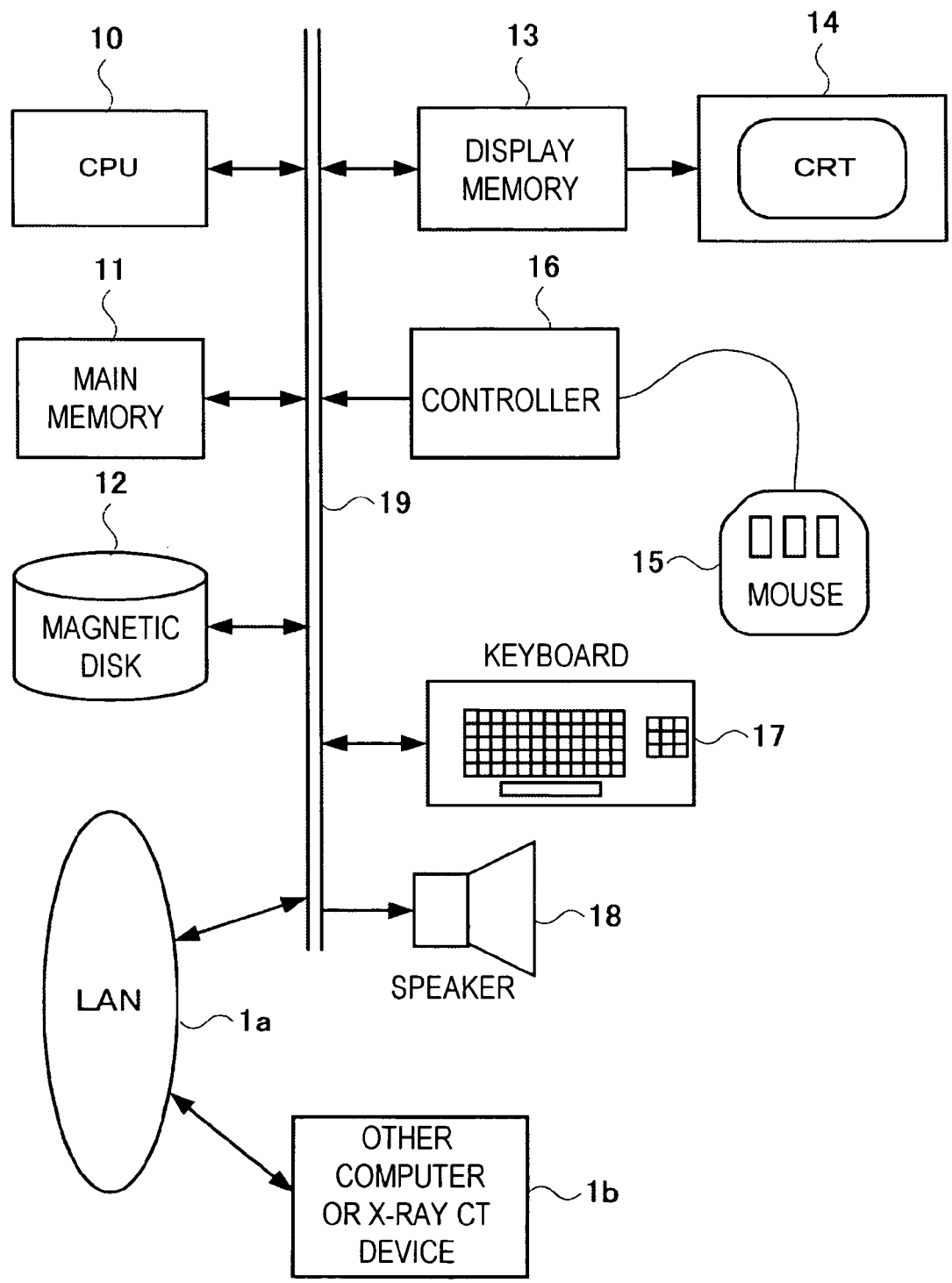
FIG. 23 is a block diagram showing a hardware configuration of the whole region-extracting device of which the present invention is applied.

FIG. 23 is a block diagram showing a hardware configuration of the whole region-extracting device of which the present invention is applied. This region-extracting device is, for example, for using an X-ray CT image of a heart as a processing object image, specifying the vicinity of the cardiac surface area, and acquiring and displaying the blood vessel pattern running over the surface area. This region-extracting device comprises:

central processing unit (CPU) 10 for controlling the operation of the respective constituent elements;

main memory 11 for storing the controlling program of the whole device;

magnetic disk 12 for storing a plurality of tomographic (image) data and programs;

display memory 13 for temporarily storing image data for display;

CRT display 14 as a display device for displaying images based on image data from display memory 13;

mouse 15 and its controller 16 for operating the soft switch on an image;

keyboard 17 provided with keys and switches for setting various types of parameters;

speaker 18; and common bus 19 for connecting the above-mentioned respective constituent elements.

Though the present invention illustrates the case of only magnetic disk 12 being connected as a memory device besides main memory 11, other devices such as floppy disk drive, hard disk drive, CD-ROM drive, magnetic optical (MO) disk drive, ZIP drive, PD drive or DVD drive may be connected instead. Further, it may be set so that it is connectable to various types of communication network 1a such as LAN (Local Area Network), Internet, or telephone lines via communication interface, and that image data can be interchangeable between devices such as other computers or X-ray CT device 1b. Also, the region-extracting device of the present invention may interchange image data with region-extracting devices capable of collecting tomographic information of an object to be examined such as X-ray CT or MRI via communication network 1a such as the above-mentioned LAN.

Next, an example of the basic operation in the first embodiment of a region-extracting device related to the present invention as illustrated in FIG. 23 will be described according to the flow chart in FIG. 2. CPU 10 of FIG. 23 is operated according to this flow chart. In the present embodiment, at least a partial contour (a first contour) of a desired region in an image is obtained, and the region including at least the stratified region being specified by the contour is extracted.

Detailed particulars of processing content in the respective steps illustrated in the flow chart of FIG. 2 in the case of taking a heart as an example for a desired region will be described below in order of steps.

An image is displayed in step S100. In concrete terms, for example, the tomographic image data being imaged by X-ray CT device is read out from magnetic disk 12 and displayed to CRT 14 illustrated in FIG. 23. The image can be, for example, an image of a chest.

In step S101, a desired region is selected on the displayed image in step S100. The desired region, for example, can be of a heart. In this step, in the case of manually implementing the approximation on the contour of a desired region, an operator determines which region (desired region) in the image should be approximated for extracting the contour, as described below. In other words, the region to be the target of extracting a contour is determined. This step can be omitted by executing the next step S102 directly.

Figure 3:
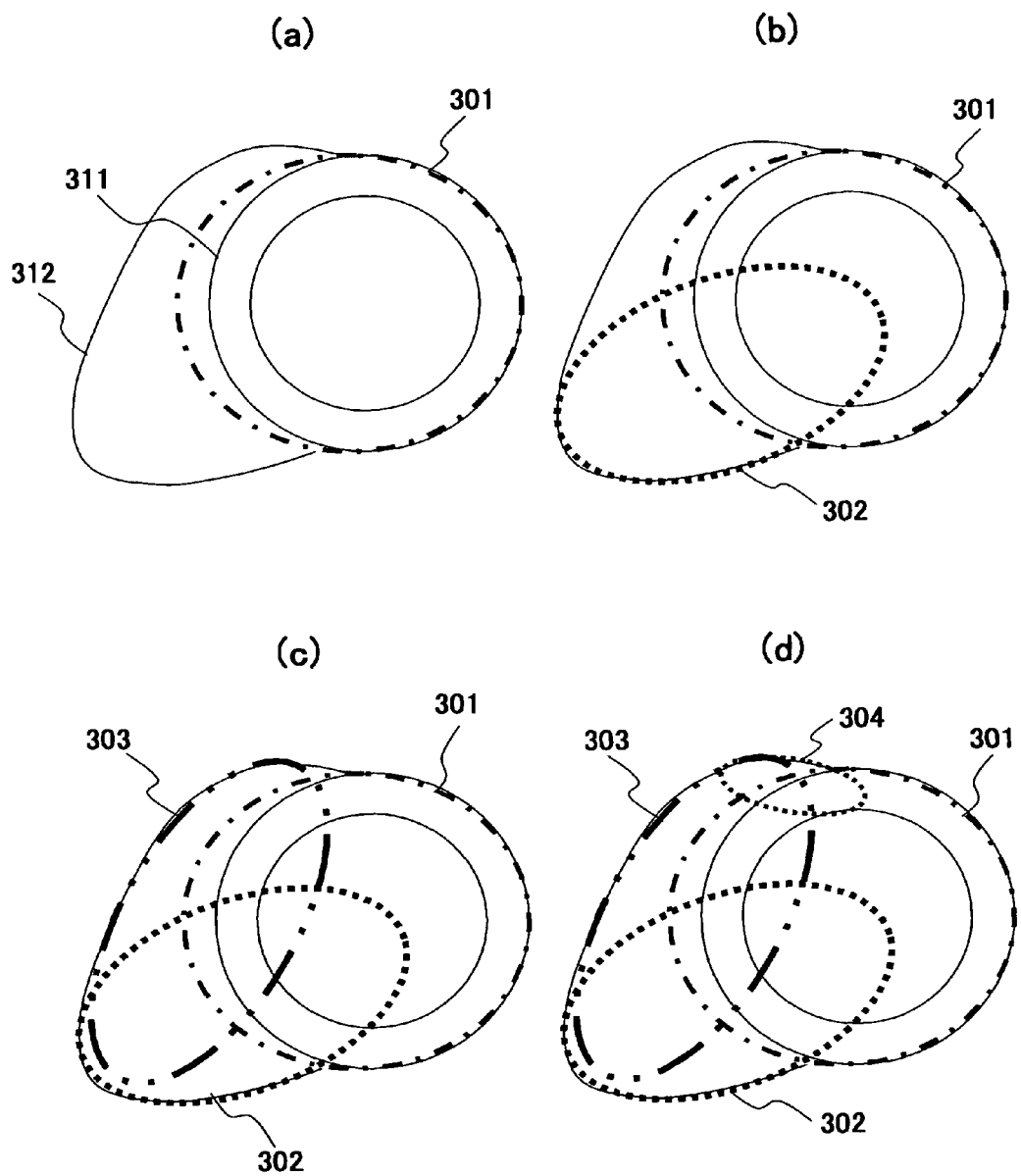
FIG. 3 is a diagram showing an example for combining four ellipses and approximating the respective ellipses mutually and independently to an outer contour of a heart.

In step S102, element graphics to approximate at least a partial contour of the partial region within a desired region being selected in step S101 are selected. The partial regions here, for example, can be myocardium or right ventricle of a heart as shown in FIG. 3. And in the case of using ellipses as an element graphic, as shown in FIG. 3, ellipse 301 can be selected for approximating the right part of myocardium outer contour 311 (FIG. 3(a)), ellipse 302 can be selected for approximating the bottom part of right ventricle outer contour 312 (FIG. 3(b)), ellipse 303 can be selected for approximating the left part of right ventricle outer contour 312 (FIG. 3(c)), and ellipse 304 can be selected for approximating the upper part of right ventricle outer contour 312 (FIG. 3(d)).

In step S103, at least a partial contour of an element graphic is approximated to at least a partial contour of a partial region.

The first procedure for approximating this element graphic to an outer contour of a partial region within a desired region will be described referring to FIG. 3.

First, ellipse 301 is allocated so that the right part of ellipse 301 is approximated most to the right part of myocardium outer contour 311 (FIG. 3(a)). Then, ellipse 302 is allocated so that the left part of ellipse 302 is approximated most to the bottom part of right ventricle outer contour 312 (FIG. 3(b)). Next, ellipse 303 is allocated so that the upper part of ellipse 303 is approximated most to the left part of right ventricle outer contour 312 (FIG. 3(c)). Lastly, ellipse 304 is allocated so that the upper part of ellipse 304 is approximated most to the upper part of right ventricle outer contour 312 (FIG. 3(d)). These respective ellipse approximations are implemented one at a time while steps S102~S104 are repeated.

In other words, this first procedure is to allocate the ellipses one at a time independently to the outer contour of the respective partial regions within the heart. In this case, the allocation of the respective ellipses may be determined mutually and independently after all of the ellipses 301~304 are displayed together with an image, or the operation to mutually and independently determine the allocation of the ellipse may be repeated as additionally displaying each ellipse on an image.

Next, the second procedure for approximating element graphics to the outer contour of the respective partial regions within a desired region will be described according to FIG. 5. This second procedure is for using the element graphics that are approximated to the contour from the start to a certain degree, by placing a plurality of points or at least one curve on a contour of a desired region or a partial contour thereof, and selecting and displaying element graphics passing through those points, curves, or the vicinity thereof.

An example as shown in FIG. 5(a) in the case of placing a plurality of points on a contour of a desired region or a contour of a partial region thereof will now be described. For example, points 501~504 are placed using a pointing device such as mouse 15 on the right part of myocardium outer contour 311.

Then one ellipse 511 passing through these four points or the vicinity of them is selected and displayed. A degree of approximation of the ellipse to the right part of myocardium outer contour 311 is further improved by adjusting the position, size or shape of ellipse 511. The allocation of the subsequent ellipses are determined in a similar manner by placing a plurality of points on a contour of a desired region or on the contour of the partial region thereof, and by selecting and displaying the ellipses passing through these points or the vicinity of them.

Also, an example as shown in FIG. 5(b) in the case of placing one or more curves on a contour of a desired region or the contour of the partial region thereof will be described. For example, curve 505 is arranged by tracing with a pointing device such as mouse 15 along the bottom part of right ventricle outer contour 312. And one ellipse 512 passing through this curve 505 or the vicinity of it is selected and displayed. A degree of approximation of the ellipse to the bottom part of right ventricle outer contour 312 is further improved by adjusting the position, size or shape of this ellipse 512. The positions of the subsequence ellipses is determined in a similar manner by placing one or more curves along a desired contour or the partial region of the contour thereof, and selecting and displaying the ellipses passing through these curves or the vicinity of them.

Though an example of selecting ellipses as element graphic was described in the above-mentioned example referring to FIG. 5(a) and (b), the procedures will be the same in the case of selecting the patterned graphics (to be described later) passing through a plurality of points or at least one curve or the vicinity of them. In this case of selecting a patterned graphic, each element graphic that configures the patterned graphic will be individually approximated after the pattern graphic has been selected and displayed.

Figure 9:
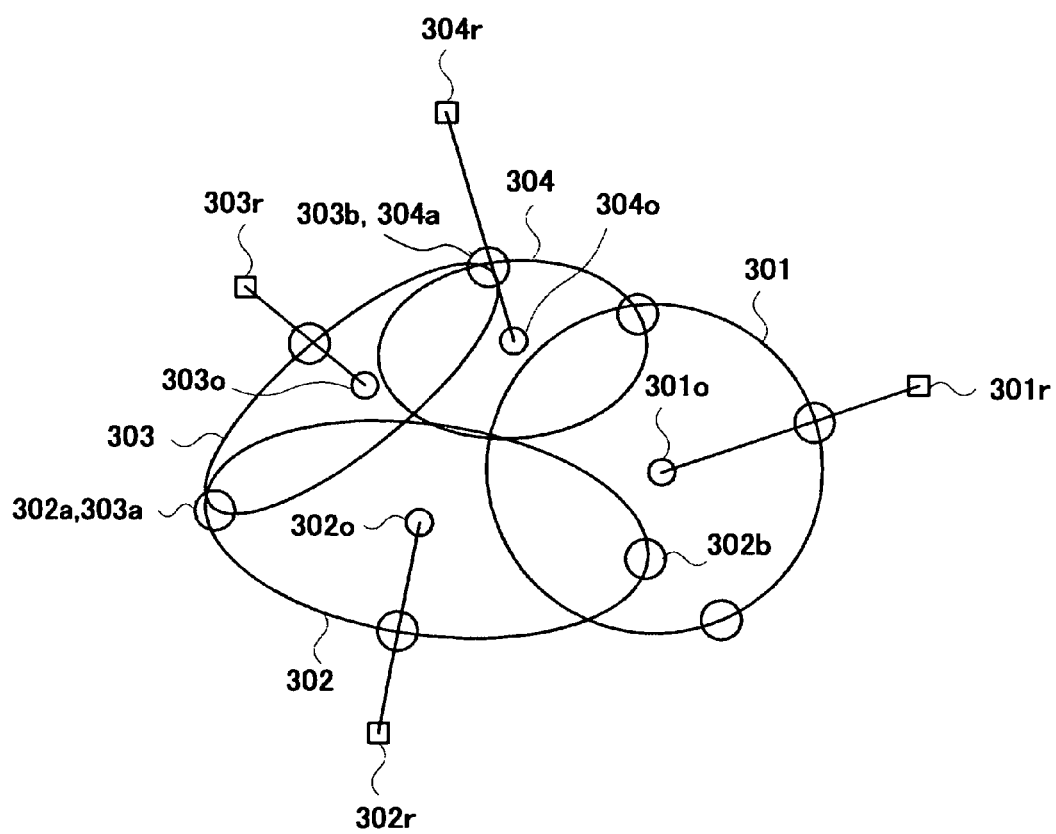
FIG. 9 is a diagram showing an example of a method for operating the ellipses in the case of extracting an outer contour of a heart by a combination of four ellipses.

In addition, a method similar to, for example, an operation method of one ellipse shown in FIG. 9 can be used as a method to change a position, size or shape of the respective ellipses in any procedure. The detailed description of the ellipse-operation method will be provided later in the description with regard to FIG. 9.

Figure 12:
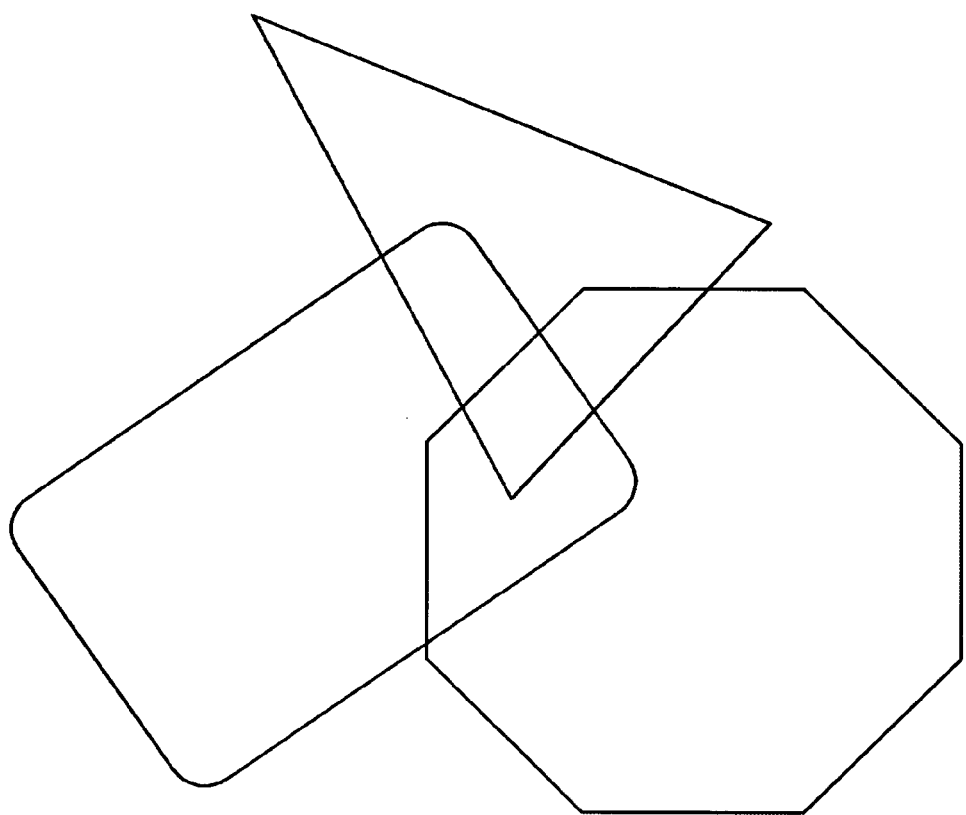
FIG. 12 is a diagram showing a variation example of the element graphics in the case of approximating an outer contour using the patterned graphics.

Also, though an example for using ellipses as element graphics was described above, it is possible to use some other shapes. An example of this case is shown in FIG. 12. As illustrated in FIG. 12, polygons such as a triangle, square, or octagon may be used as element graphics for the approximation of contours. In this case when using a shape with sharp corners such as a triangle or square, there are occasions that it is preferable to round out the corners so that the approximation, to organs, with high accuracy can be implemented.

In step S104, a judgment of whether a contour approximation of a desired region is completed or not is carried out. When completed (yes), step S106 will proceed. When not completed (no), the procedure returns to step S102, the selection of element graphics corresponding to at least a partial contour of a partial region to be approximated and the approximation process by the element graphics being selected are carried out in each of previously mentioned steps S102 and S103, and this will be repeated until the contour approximation of the desired region is completed.

In step S105, a contour, by which at least a part of the respective element graphics after approximation are combined, is set as a first contour. For example, as shown in FIG. 13 (A), combining the outer contour parts of respective ellipses 301~304 illustrated in dotted line which are not mutually overlapping creates a curve that approximates, with high precision, an outer contour of a heart, and this curve can be set as a first contour.

In step S106, a second contour is obtained based on the first contour being acquired in step S105. For example, a second contour can be acquired through enlarging or reducing the first contour with a predetermined magnification. The second contour will be on the outside of the first contour if the magnification is bigger than 1, and the second contour will be on the inside of the first contour if the magnification is smaller than 1. The second contour can also be set by enlarging or reducing the respective element graphics being used for obtaining the first contour in step S105 with predetermined magnification, and then combining the outer contour parts of these respective ellipses being enlarged or reduced which are not mutually overlapping. Or, it can also be set by combining the outer contour parts of the respective ellipses that are not mutually overlapping, after changing a size, position or shape of the respective element graphics being used for obtaining the first contour in step S105. This last example will now be illustrated referring to FIG. 13(A). In FIG. 13(A), the second contour is obtained by combining the outer contour parts of the original ellipses 301~304 of which the size and so forth are changed so that are not mutually overlapping.

Though an example of approximating the whole contour of a desired region by a plurality of element graphics was described above, only a partial contour of the desired region may also be approximated. In this case also as mentioned above, a partial contour of the desired region is approximated by at least a partial contour of the respective element graphics.

In step S107, a region held between the first contour and the second contour respectively acquired in step S105 and step 106 is set as a stratified region encompassing the desired region, and the region at least including this stratified region is extracted.

For example, as shown in FIG. 13(A), stratified region 1303 held between first contour 1301 and second contour 1302 can be extracted as a stratified region encompassing a heart.

Particularly, in the case of enlarging or reducing the second contour by a predetermined magnification of the first contour, the outside of the stratified region of the first region (that is the surface area of the desired region) is extracted if the predetermined magnification is bigger than 1, and the inside of the stratified region of the first contour is extracted if the predetermined magnification is smaller than 1. The magnification in the case of extracting a stratified region of the outside can be, for example, 1.2 times. Also, the magnification in the case of extracting a stratified region of the inside can be, for example, 0.8 times.

Or, as shown in FIG. 13(B), a region on the side of the first contour including this stratified region 1303 can be extracted. On the contrary, a region on the side of the second contour including stratified region 1303 can be extracted. FIG. 13(B) is a diagram showing the region being extracted by filling the inside of the entire second contour region 1302 with a steady value (a region on the side of the first contour including the stratified region). This steady value region can be acquired by repeating the process of filling the inside of contour 1302 with a steady value from right to left or up and down until it reaches to contour 1302. Or, the inside of the former contour 1301, not of contour 1302, can be extracted by filling up with a constant value. An inner contour region can be extracted also as it is without filling up with a constant value in any cases. In this way, the inner contour regions based on the first contour or the second contour being extracted in step S105 and S106, not the stratified region, may be extracted. Or, the outside region of the first contour (a region on the side of the second region including the stratified region) or the outside region of the second contour may be extracted.

Also, though the example in the case of second contour 1302 being on the outside of the first contour was described in FIG. 13(B), the extraction would be proceeded in the same manner when it is on the inside of first contour 1301. In the case of the second contour being on the outside as shown in FIG. 13(B) the surface area of a desired region is included as extracted, and in the case of it being inside the inside region of the desired region is extracted.

Additionally, in the case of approximating a partial contour of a desired region, a partial contour thereof, the stratified region being specified by the partial contour or the region in the vicinity of the contour is to be extracted.

As described above, according to the first embodiment of the present invention, contour-extraction of a desired region can be implemented in a short period of time with a simple operation and high accuracy, without being deceived by image-noise or the unclear border of organs. It also enables an effective image processing with high precision by extracting regions including at least stratified regions based on the contours being extracted, and performing a desired image processing being specified to the region thereof.

The Second Embodiment

Next, the second embodiment of the region-extracting device and method related to the present invention will now be described. In this embodiment, a region including at least a stratified region encompassing a desired region is extracted from the respective plural slices of a tomographic image, and the plurality of regions being extracted from the respective tomographic images is synthesized to create a 3-dimensional region. This 3-dimensional region is then specified, and the desired image processing will be performed.

The description on the configuration of the region-extracting device in the second embodiment will be omitted since it is the same as the one of the first embodiment. Also, an example of the basic operation in the second embodiment will be described based on the flow chart shown in FIG. 2. CPU 10 in FIG. 23 operates according to this flow chart. The procedure for the contour approximation of a desired region in the present embodiment may be the same as the previously mentioned first or second procedures, but an example of another approximating procedure will be described here.

Described below is an example of the detailed processing content regarding each step illustrated in the flow chart in FIG. 2 in order of steps in the case of taking a heart as an example for the desired region.

In step S200, 1 is set on counter k that is for repeatedly processing a plurality of tomographic images, and an initialization is implemented. For example, in the case of sequentially processing N-slices of tomographic image data being acquired by imaging a heart region by X-ray CT device, from the tomographic image data of the first slice, the process on and after the next step is to be implemented.

In step S201, k-th tomographic image including a desired region as a target region for the contour-extracting process is displayed on the display device. In concrete terms, for example, k-th tomographic image data being imaged by an X-ray CT device is read out from magnetic disk 12 and displayed to CRT 14 shown in FIG. 23. Also, the patterned graphics for extracting contours are displayed on the same screen of the display device. This patterned graphic is configured by combining a plurality of element graphics.

Figure 21:
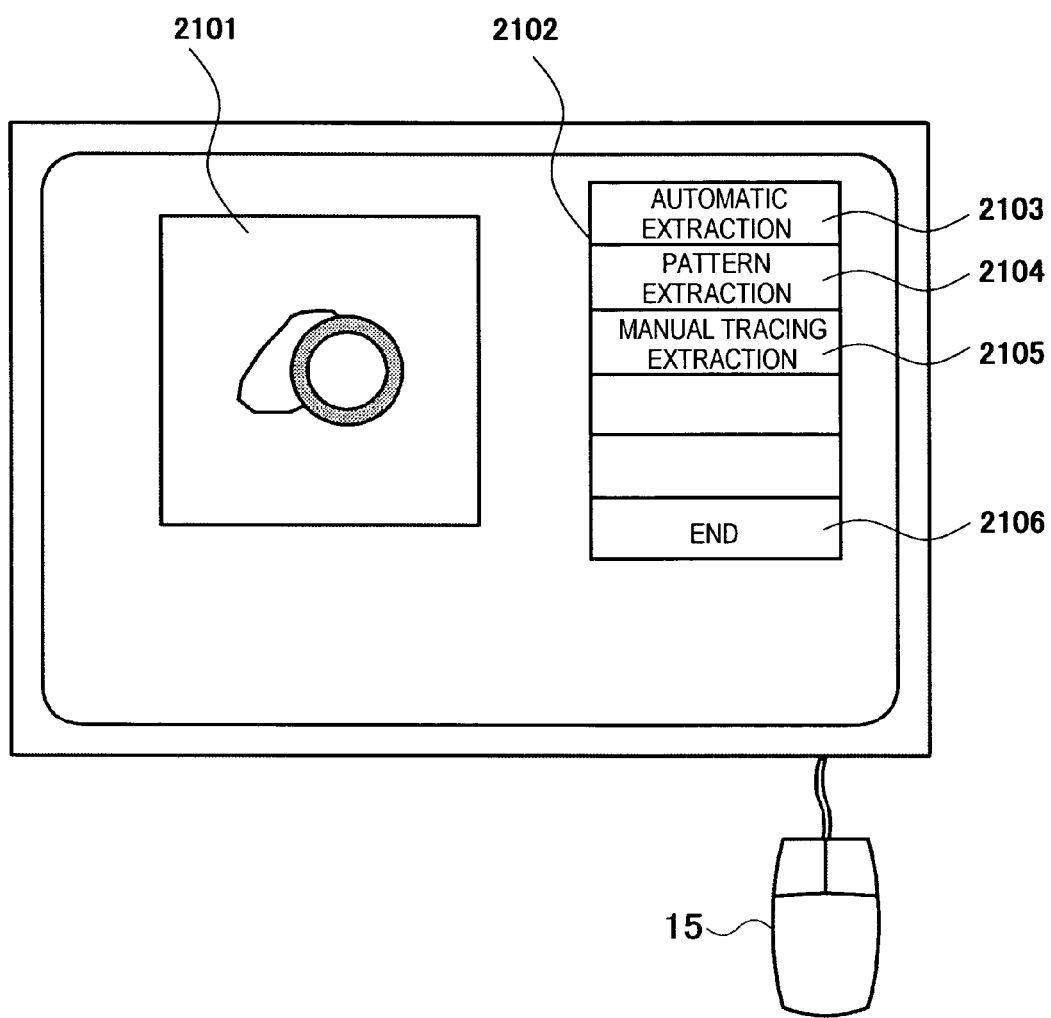
FIG. 21 is a diagram showing an example of the images for selecting a method regarding how to extract a specified area (region) in the case of extracting a specified area (region) from the tomographic images with black and white or color imaging.

An example of tomographic image display is illustrated in FIG. 21. For example, tomographic image 2101 with black and white or color imaging such as X-ray CT image is displayed on the left side of a screen, and menu 2102 (details will be described later) for selecting a method to extract a contour of a desired region (an organ or region) from tomographic image 2101 is displayed on the right side of the screen.

After displaying an image, an operator determines which region (desired region) should be the target for extracting a contour. A heart can be, for example, selected for the desired region. This step is equivalent to steps S100 and S101 in FIG. 1.

In step 202, a patterned graphic for extracting a contour is selected. Or, on the contrary, the patterned graphic may be ultimately created, after a plurality of element graphics have been individually selected. This step is equivalent to step S102 in FIG. 1.

It is common that organ shapes of objects to be examined are vastly different and diverse. Thus it is preferable to provide a plurality of patterned graphics to respond flexibly to as many different shapes as possible, so that a suitable pattern can be selected for extracting a contour from a wide range of patterned graphics.

Figure 4:
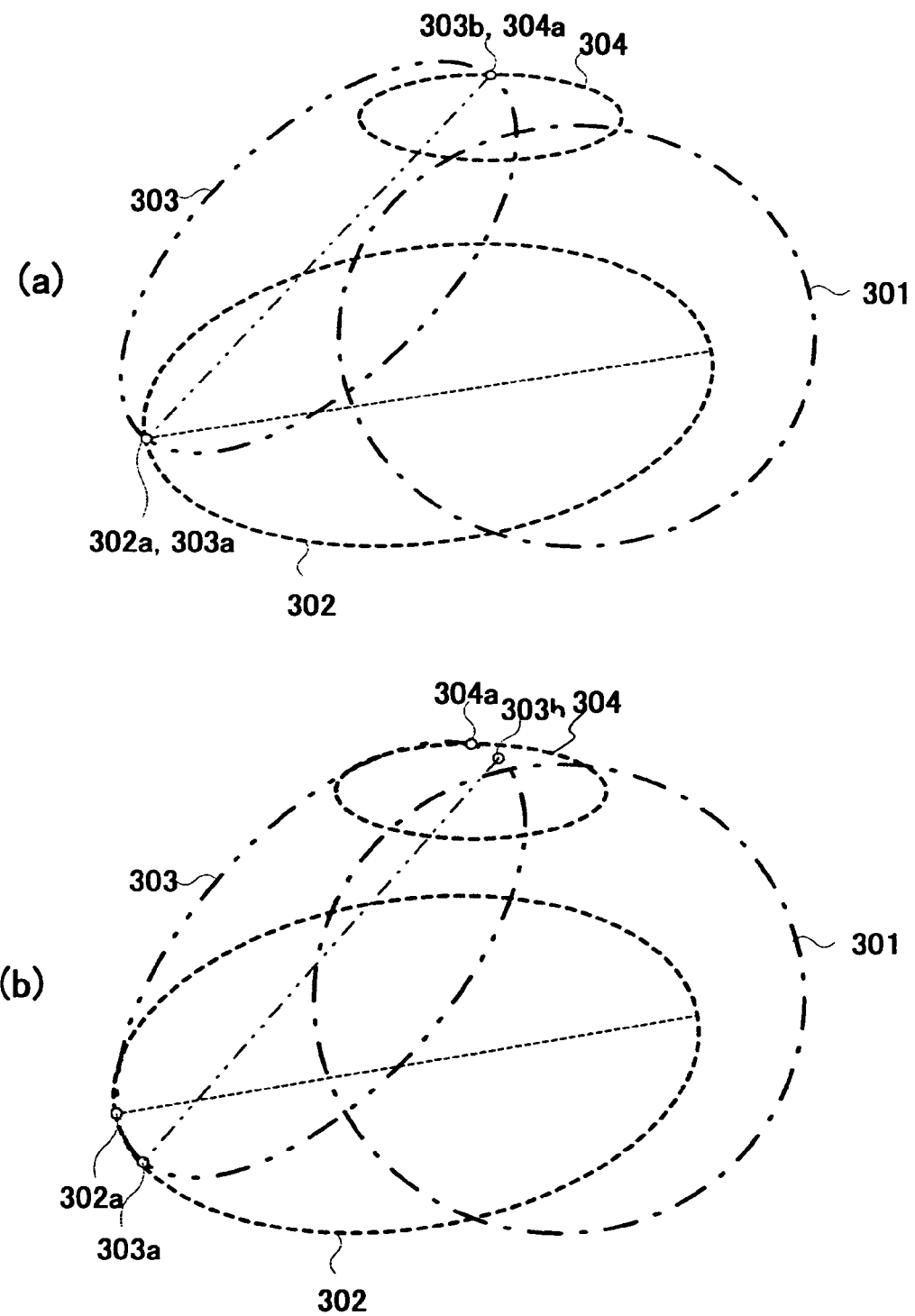
FIG. 4 is a diagram showing an example in the case of combining four ellipses, interlocking at least two of them and approximating them to the outer contour of a heart.

The examples of the patterned graphics are illustrated in FIG. 4. The patterned graphics in FIG. 4 are configured, with ellipses as element graphics, by combining four different sized ellipses 301~304. In these patterned graphics, ellipse 301 is indicated with dashed lines, ellipses 302 and 304 with dotted lines, and ellipse 303 with chain double-dashed lines. Also, ellipse 301 is an ellipse that is close to a perfect circle.

Figure 7:
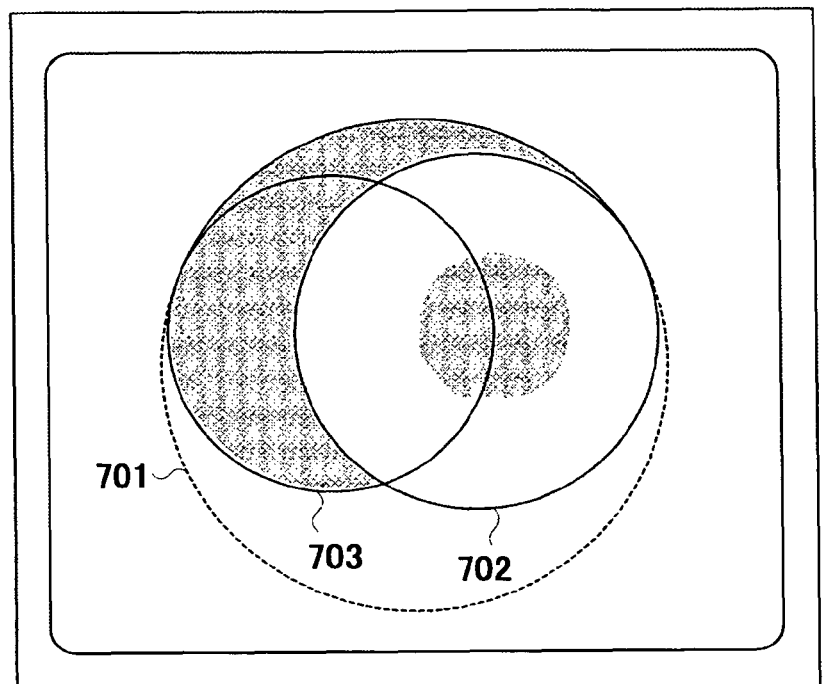
FIG. 7 is a diagram showing an example in the case of extracting an outer contour of a heart by combining three ellipses that are close to a circle.

Moreover, another example of patterned graphic is illustrated in FIG. 7. The patterned graphic in FIG. 7 is configured by combining an ellipse close to a perfect circle as an element graphic and three different-sized ellipses 701~703. Ellipse 701 is indicated with a dotted line, and ellipses 702 and 703 are with a solid line. Ellipse 701 is the largest in size, and close to a perfect circle.

The number of element graphics should be one or more. If it is one, an element graphic itself becomes a patterned graphic.

The above-mentioned patterned graphics being illustrated in FIG. 4 and FIG. 7 are for extracting contours using a prepared graphic by combining a plurality of element graphics in advance. However, on the contrary, it also is possible to create a patterned graphic by individually arranging element graphics one by one, and synthesizing the positioning configuration of the respective element graphics at the point of determining the ultimate arrangement.

Or, as described in the above-mentioned second procedure referring to FIG. 5, it is possible to use a patterned graphic or element graphic being approximated from the beginning to a certain degree, by placing a plurality of points or at least one curve on the contour of a desired region or a contour of the partial region thereof, and displaying the patterned graphic or one element graphic passing though these points or curves, or the vicinity of these points or curves.

The patterned graphic or element graphic being selected as described above is displayed along with an image. Practically, data of the patterned graphic or element graphic are stored, for example, in main memory 11 or display memory 13 indicated in FIG. 23, and the patterned graphic or element graphic is displayed together with an image based on these data. In a case where patterned graphics or element graphics are newly generated, data for corresponding to them are generated in the memory thereof. However, patterned graphics or element graphics may be merely stored in the memory without being displayed.

In step S203, a contour of a pattern graphic is approximated to a contour of a desired region. To accomplish this process, each contour of a plurality of element graphics is approximated to a contour of the desired region. Specifically, at least a partial contour of the respective element graphics are approximated to at least a partial contour of the respective desired regions. Or, in the case where a desired region includes a plurality of partial regions, at least a partial contour of at least one element graphic is approximated to a contour of at least one partial region. In this way, after approximating a plurality of element graphics to a contour of a desired region, the outer contours of the respective element graphics that are not overlapping are interlinked and set as a contour of a patterned graphic. This step is equivalent to step S103 of FIG. 1.

The procedure to approximate this patterned graphic to a contour of a desired region can be executed by approximating the respective element graphics configuring this patterned graphic to a contour of a desired region, using the previously mentioned first procedure or the second procedure. Here, another procedure (third procedure) will be described.

The third procedure for approximating the patterned graphic to an outer contour of a heart based on FIG. 4 will now be described. The indication of myocardium outer contour 311 and right ventricle outer contour 312 are omitted in FIG. 4(*a*) and (*b*). First, ellipse 301 is allocated so that the right part of ellipse 301 is most approximated to the right part of myocardium outer contour 311. Then, ellipse 302 and 303 are allocated so that the bottom part of ellipse 302 is most approximated to the bottom part of right ventricle outer contour 312 and the left part of ellipse 303 to the left part of right ventricle outer contour 312, using two ellipses 302 and 303 of which long axis points 302*a* and 303*a* coincide. Next, ellipses 303 and 304 are allocated so that the left part of ellipse 303 is most approximated to the left part of right ventricle outer contour 312 and the upper part of ellipse 304 is to the upper part of right ventricle outer contour 312, using two ellipses 303 and 304 of which long axis point 303*b* of ellipse 303 and short axis point 304*a* of ellipse 304 coincide. After these steps, in order to smoothen the interconnection near the point of identity of long axis point 302*a* of ellipse 303 and long axis point 303*a* of ellipse 303, ellipses 302 or 303 are translated so that the mutual curves near the point of identity of both ellipses 302 and 303 are drawn as close as possible (in other words so that the curves in the vicinity of the point of identity overlap when possible). Also, in order to smoothen the interconnection near the point of identity of long axis point 303*b* of ellipse 303 and short axis point 304*a* of ellipse 304, ellipse 303 or 304 is translated so that each of the curves near the point of identity of both ellipses 303 and 304 draw as close as possible. The appearance after the translation is shown in FIG. 4(*b*).

An outer contour of a heart can also be obtained ultimately using a plurality of ellipses according to the above-mentioned third procedure. The outer contour of a heart being obtained using one of the first~third procedures are shown in FIG. 6 (A)~(C) with dotted lines. Since the outer contours of a heart gradually change according to the imaging position in FIG. 6, the most appropriate contour is extracted by changing the size and/or position to accommodate these changes.

Also, an example for approximating another example of patterned graphic shown in FIG. 7 to an outer contour of a heart is illustrated in FIG. 8. The respective ellipses configuring the patterned graphics, in FIG. 8, are shown with dotted lines. Also, the display of myocardium outer contour 311 and right ventricle outer contour 312 are omitted in FIG. 7. The procedure for approximating the patterned graphic in FIG. 7(a) to an outer contour of a heart is, for example, as follows. First, ellipse 701 is allocated so that each of the right part and the left part of ellipse 701 are most approximated to each of the right part of myocardium outer contour 311 and the left part of right ventricle outer contour 312. Then, using two ellipses 702 and 703 that are touching ellipse 701 internally, ellipse 702 is allocated so that the right part of ellipse 702 is most approximated to the right part of myocardium outer contour 311, and ellipse 703 is allocated so that the left part of ellipse 703 is most approximated to the left part of right ventricle outer contour 312. Next the lower half of large ellipse 701 is deleted, and three ellipses 701~703 are smoothly connected. In this way, smooth contour 704 is ultimately obtained as shown in FIG. 7(b). The approximation setting of the respective ellipses that are element graphics can also be implemented in any of the first~third procedures in this type of patterned graphic.

Outer contour 704 of a heart being obtained as stated above is shown in FIG. 8(A)~(C) with dotted lines. In FIG. 8, since the cardiac outer contour gradually changes according to imaging positions, the most appropriate outer contour is extracted by changing the size and position of the ellipses to accommodate those changes.

FIG. 9 is a diagram showing an example of the operation method of the third procedure for transforming the respective ellipses in the case of extracting an outer contour of a heart by the patterned graphic being combined with four ellipses such as shown in FIG. 4. The operation method of the respective ellipses in the above-mentioned first and second procedure are the same as those of the third embodiment, but the difference is that the long axis point or the short axis point of the two ellipses do not move as coinciding, hence the respective ellipses move individually as will be described below.

The respective ellipses 301~304 can be rotated around midpoints 301o~304o by moving rotors 301r~304r denoted with squares being outside of the respective ellipses 301~304 using a pointing device such as a mouse, trackball or light pen. Also, the size or shape of the ellipses can freely be changed, since the position of the long axis point and the short axis point of respective ellipses 301~304 are movable using a pointing device such as a mouse. At this time, long axis point 302a of ellipse 302 and long axis point 303a of ellipse 303 should coincide upon moving. In the same way, long axis point 303b of ellipse 303 and short axis point 304a of ellipse 304 should also coincide upon moving. In this way, the respective ellipses 301~304 are allocated so that the shapes of these four ellipses are most approximating to the outer contour of a heart on the tomographic image in FIG. 6 by changing them in various manners. As previously mentioned, after this allocation, in order to smoothen the interconnection near the point of identity of long axis point 302a of ellipse 302 and long axis point 303a of ellipse 303, ellipse 302 or 303 is translated so that each of the curves near the point of identity of long axis 302a of ellipse 302 and long axis 303a of ellipse 303 would be as close as possible. Then, in order to smoothen the interconnection near the point of identity of long axis point 303b of ellipse 303 and short axis point 304a of ellipse 304, ellipse 303 or 304 is translated so that each curves near the point of identity of both ellipses 303 and 304 would be as close as possible. In this way, the patterned graphic for smoothly approximating the outer contour of a heart can be ultimately obtained. The translation of ellipses can be implemented, for example, by translating the rotors 301o~304o of the respective ellipses by using a pointing device such as mouse.

Figure 10:
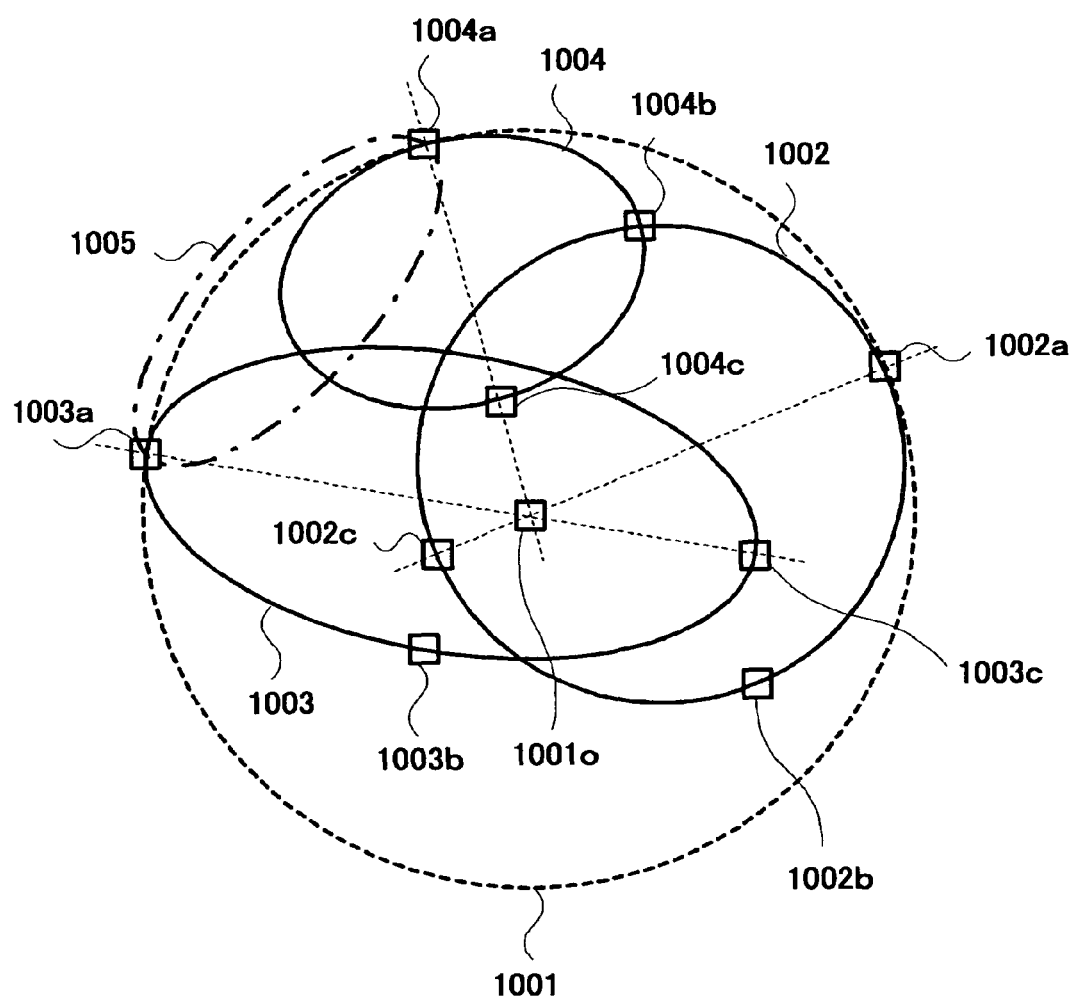
FIG. 10 is a diagram showing another example of the method for operating the ellipses in the case of extracting an outer contour of a heart by a combination of four ellipses.

FIG. 10 is a diagram showing another example for the operation method of the ellipses in the case of extracting an outer contour of a heart by the combination of four ellipses. On ellipse 1001 which is close to a perfect circle, three ellipses 1002~1004 are placed so that long axis points 1002a, 1003a and short axis point 1004a would touch ellipse 1001 internally. The long axis of ellipse 1002 and 1003, and the short axis of ellipse 1004 pass through center 1001o of ellipse 1001. Respective ellipses 1002~1004 can change their shape by moving long axis points 1002c, 1003c, and short axis point 1004c, and short axis points 1002b, 1003b and long axis point 1004b which are on the opposite end of the long/short axis points touching ellipse 1001 internally, using a pointing device such as a mouse. In this case, long axis points 1002a, 1003a and short axis point 1004a of the respective ellipses 1002~1004 touching ellipse 1001 internally would move on ellipse 1001. By moving center 1001o of ellipse 1001 by means of a pointing device such as a mouse, ellipses 1002~1004 may change their shape, keeping the condition of touching ellipse 1001 internally. The respective ellipses 1002~1004 may be set to be shape-changeable as seen in FIG. 9, by deleting ellipse 1001 after the shapes of ellipses 1002~1004 are determined. Also, an ellipse equivalent to ellipse 303 of FIG. 9, such as ellipse 1005 being denoted with a chain line and has the long axis points on each of long axis point 1003a of ellipse 1003 and short axis point 1004a of ellipse 1004 may be newly added and displayed.

Figure 11:
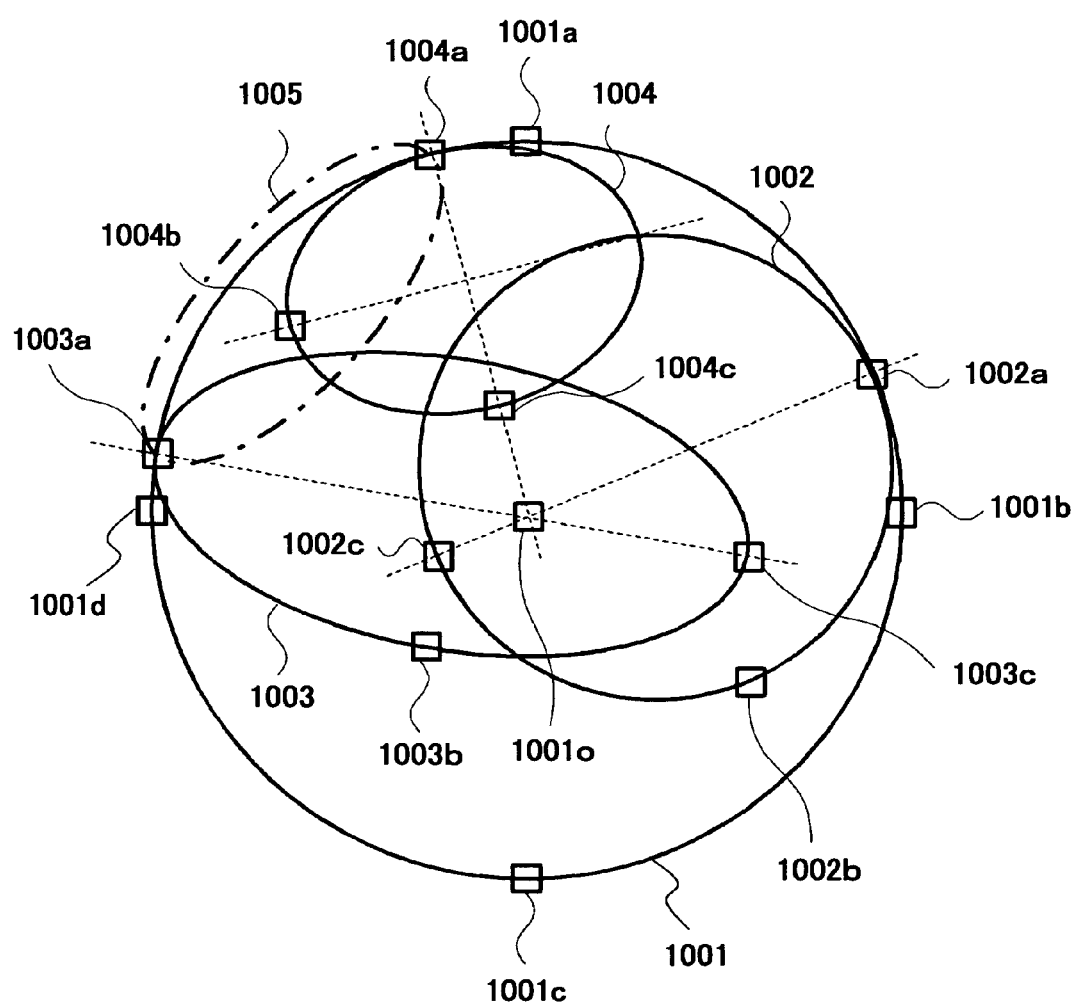
FIG. 11 is a diagram showing still another example of the method for operating the ellipses in the case of extracting an outer contour of a heart by a combination of four ellipses.

FIG. 11 is a diagram showing another example for the operation method of the ellipses in the case of extracting an outer contour of a heart by the combination of four ellipses. As in the case of FIG. 10, three ellipses 1002~1004 are placed so that long axis points 1002a, 1003a and short axis point 1004a would touch ellipse 1001 which is close to a perfect circle internally. The long axis of ellipses 1002 and 1003 and the short axis of ellipse 1004 pass through center 1001o of ellipse 1001. Respective ellipses 1002~1004 can change their shape by moving long axis points 1002c, 1003c and short axis point 1004c, and short axis points 1002b, 1003b and long axis point 1004b which are on the opposite end of the long/short axis points touching ellipse 1001 internally, using a pointing device such as a mouse. Up to this point is the same as shown in FIG. 10, but in this example, by moving the respective long axis points and short axis points 1001a~1001d by means of a pointing device such as a mouse, the entire shape of ellipse 1001 that is the outer contour being configured by three ellipses 1002~1004 can be changed. Consequently, by the shape of ellipse 1001 being changed, long axis points 1002a, 1003a and short axis point 1004 of the respective ellipses 1002~1004 internally touching ellipse 1001 would move on the contour of ellipse 1001 along with the shape-changing of ellipse 1001. By moving center 1001o of ellipse 1001 with a pointing device such as mouse, the contour of ellipse 1001 may be set as shape-changeable keeping the condition of ellipses 1002~1004 touching ellipse 1001 internally. Also, ellipses 1002~1004 may be set to be shape-changeable by deleting ellipse 1001 after the shapes of ellipses 1002~1004 are determined as shown in FIG. 9. As in the case of FIG. 10, ellipse 1005 being equivalent to ellipse 603 in FIG. 9 may be newly added and displayed.

Previously the case of using the ellipses as element graphics for configuring the patterned graphic to execute the approximation to a contour, but as shown in FIG. 12, polygons (for example, a triangle, square and octagon) may also be used instead.

According to the changes in the patterned graphics or element graphics caused by the approximation operation as described above, for example, CPU 10 modifies the data of patterned graphics or element graphics being stored in main memory 11 or display memory 13.

In addition, though an example of approximating the entire contour of a desired region by patterned graphics was described above, only a partial contour in a desired region may be approximated. Also, a partial region of a desired region may be approximated using only a part of a patterned graphic. Also in this case, a partial contour of a desired region would be approximated by a part of the respective element graphics configuring patterned graphics.

In step S204, a contour of the patterned graphic being approximated in step S203 is extracted as a contour of a desired region (a first contour). In the previously mentioned example of extracting an outer contour of a heart, as shown in FIG. 4 or FIG. 7, a contour being connected to the respective contours of a plurality of ellipses that are configuring a patterned graphic is extracted as an outer contour of a heart. If a partial contour of a desired organ region is approximated, a partial contour would be extracted.

Next, a second contour is obtained based on the first contour of a desired region. This second contour can be obtained using a method such as the one described in previously mentioned step S106.

Figure 1:
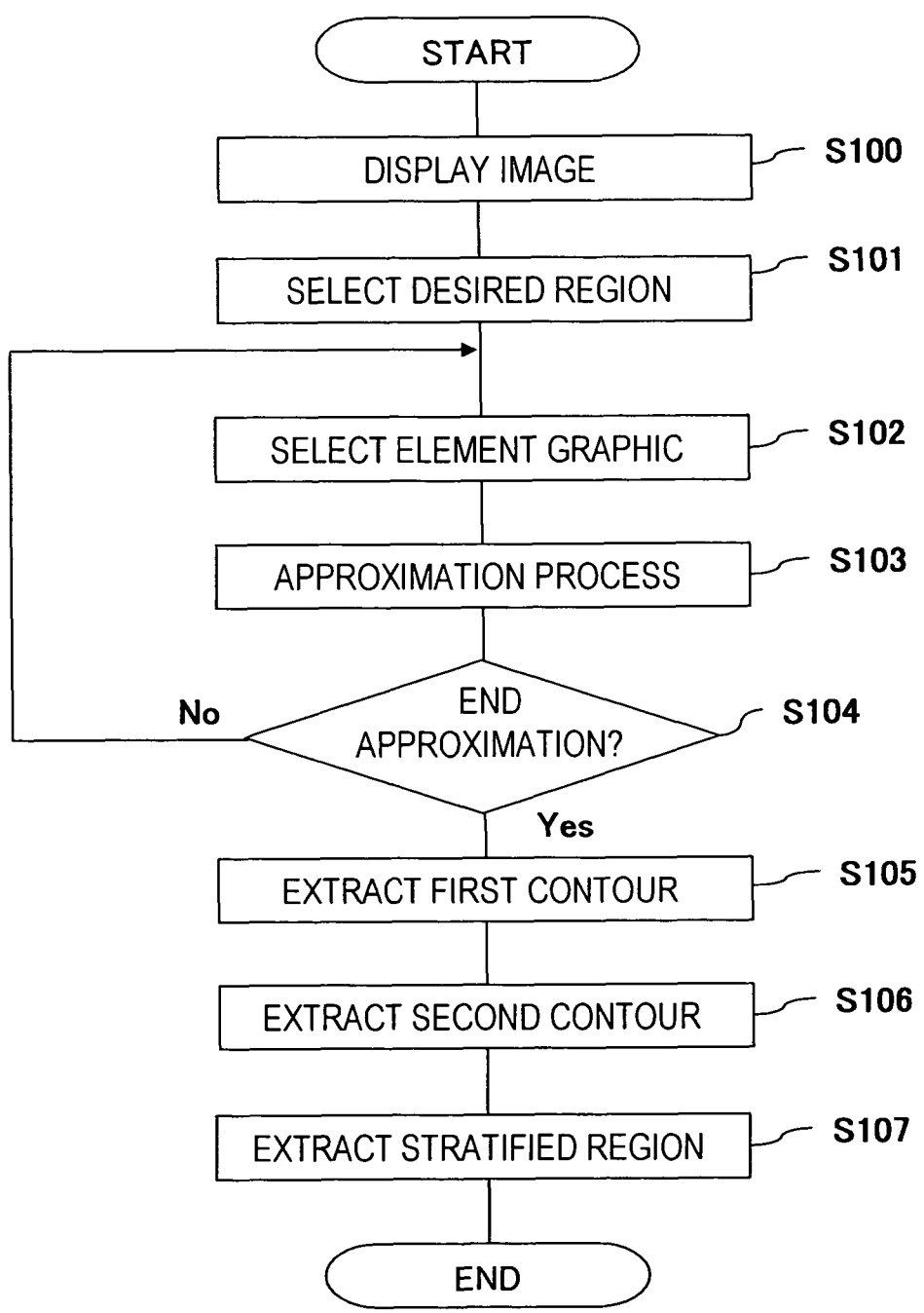
FIG. 1 is a flow chart showing a basic operation example in the first embodiment of a region-extracting device to which the present invention is applied.

This step is equivalent to step S105 and S106 in FIG. 1.

In step S205, the region including at least the stratified region being specified by two contours that are extracted in step S204 is extracted. This stratified region becomes a region that encompasses at least a part of the desired region. In concrete terms, any one of the following regions, only the stratified region, the region on the side of the first contour including the stratified region, or the region on the side of the second region including the stratified region, can be extracted. This step is equivalent to step S107 of FIG. 1.

In this embodiment also, as shown in FIG. 13(A), stratified region 1303 which is held between cardiac outer contour (the first contour) 1301 being approximated by the combination of four ellipses (shown in dotted lines) 301~304 and contour 1302 (the second contour) being acquired based on the contour 1301 can be extracted. Or, as shown in FIG. 13(B) the inside region of second contour 1302 can also be extracted.

Additionally, in the case of approximating a partial contour of a desired region by the patterned graphic, the partial contour thereof, the stratified region, or the vicinity region of the contour being specified by the partial contour thereof would be extracted.

In step S206, whether counter k is under N or not is confirmed. This means to determine whether the number of the slices that processed the contour extraction had reached the predetermined number N or not. If not reached (yes) step S209 is to be carried out and counter k is incremented, if reached (no) step S207 is to be carried out.

In step 207, a 3-dimensional stratified region encompassing the respective desired regions or a 3-dimensional region including this 3-dimensional stratified region is synthesized, using the stratified region being extracted on every slice of tomographic images or the region including this stratified region. In the case of approximating a partial contour of a desired region, a part of 3-dimensional stratified region encompassing a desired region or the 3-dimensional contour-vicinity region would be synthesized.

In step S208, a desired image processing is performed, by limiting to the synthesized 3-dimensional stratified region or image data of 3-dimensional region including this 3-dimensional stratified region.

By performing a desired image processing based on the 3-dimensional stratified region being acquired in step S207 or image data being included in 3-dimensional region including the 3-dimensional stratified region, in other words, by limiting the target for performing image processing to image data of these regions, it is possible to perform an effective image processing with high accuracy.

Figure 14:
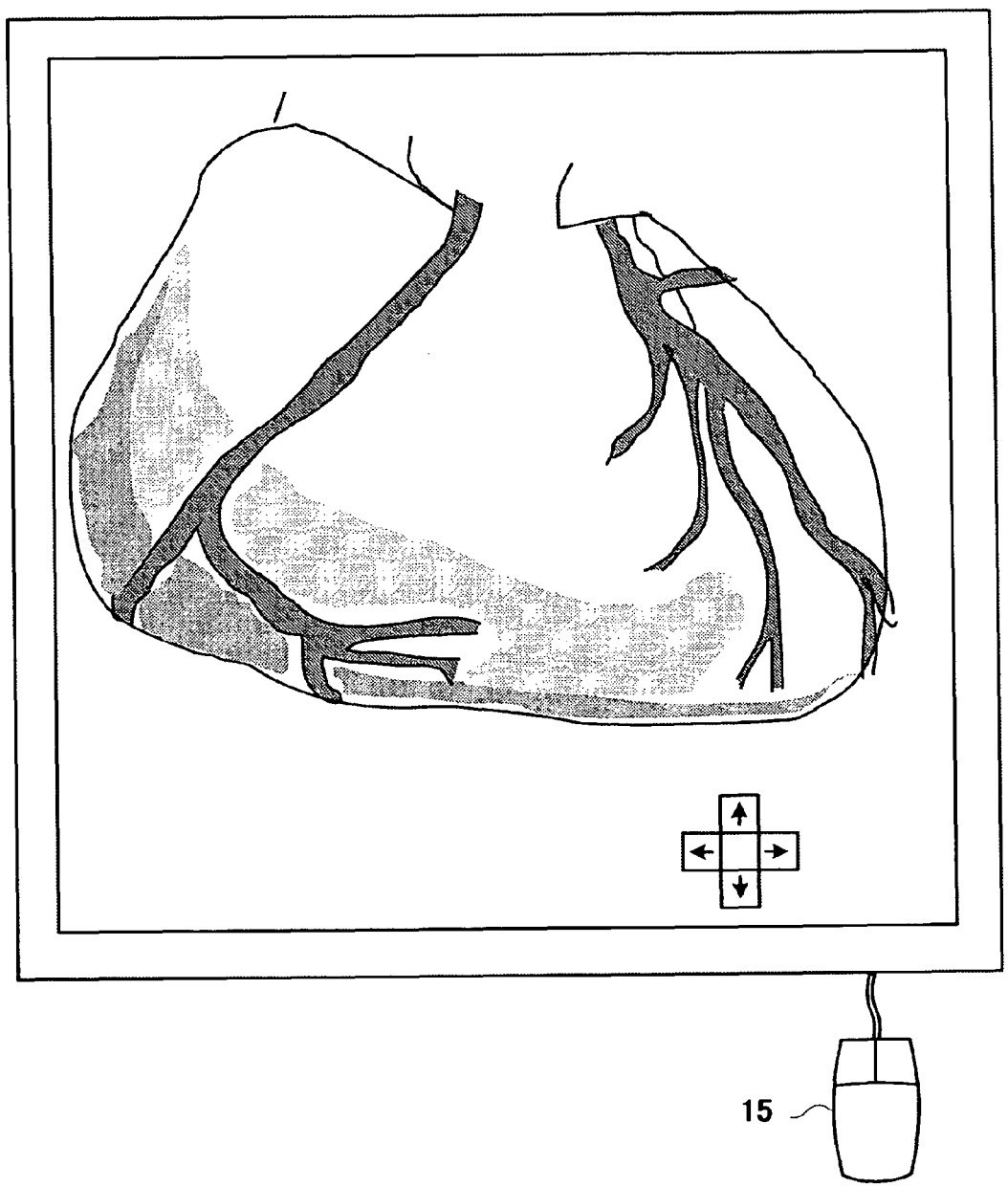
FIG. 14 is a diagram showing an example of a 3-dimensional image illustrating the blood vessel pattern running over the cardiac surface area of being obtained by performing the image processing on the stratified region of FIG. 13.

As an example of the image processing, a 3-dimensional image illustrating the blood vessel pattern running in the vicinity of a cardiac surface is shown in FIG. 14.

Figure 15:
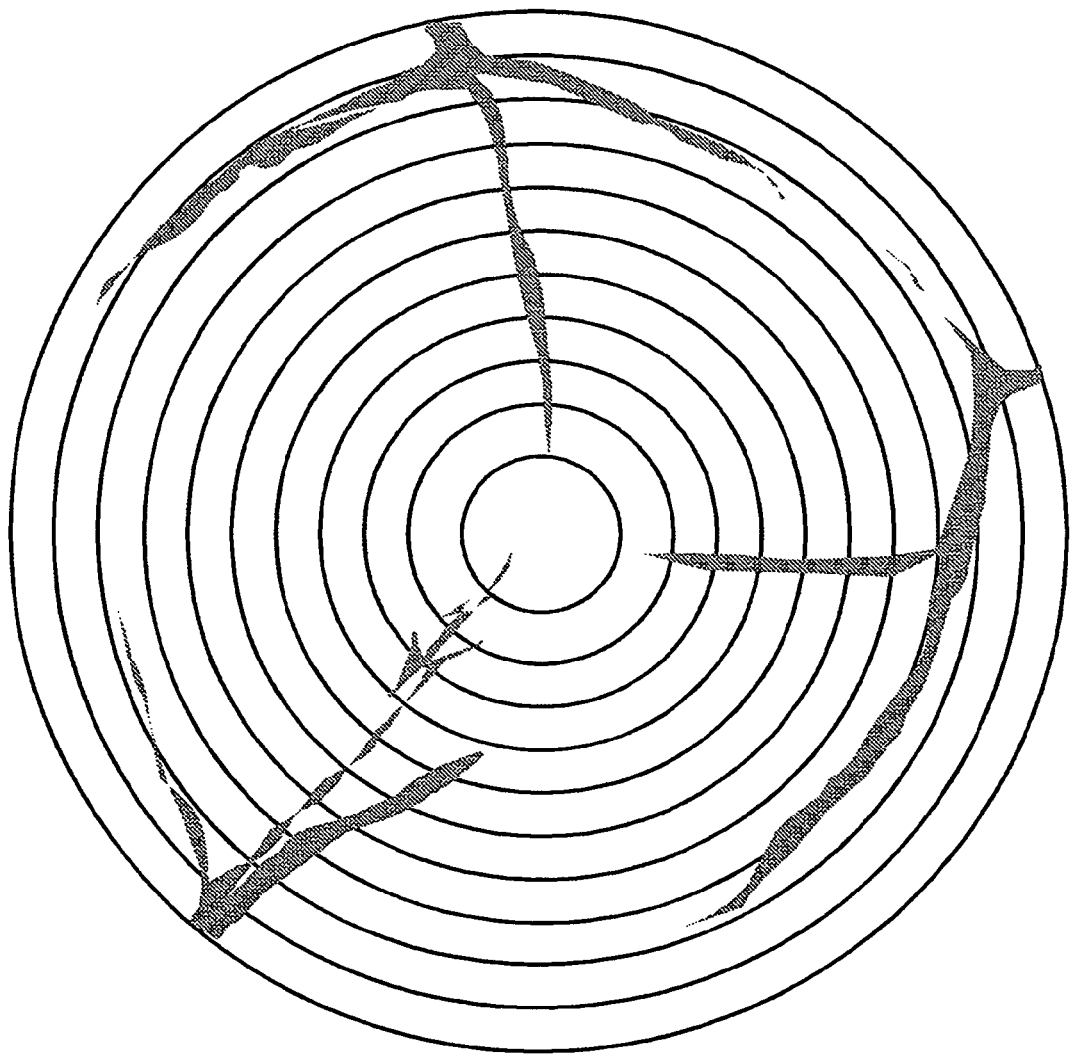
FIG. 15 is a diagram showing an example in the case of performing another 3-dimensional image processing based on the data being included in the stratified region and presenting it with Bull's-eye display.

According to the device and method relating to this embodiment, comparing to the method such as being disclosed in (non-patent document) for extracting the blood vessel pattern running in the vicinity of the cardiac surface using a tabular region with a predetermined thickness, it is possible to indicate the blood vessel pattern in 3-dimensions which enhances the clear visibility of the image. Also, as another example of image processing, an example for implementing a Bull's-eye display of the blood vessel pattern running in the vicinity of the cardiac surface is shown in FIG. 15. In this way, by implementing the Bull's-eye display using image data being included in a stratified region, the further improvement of the visibility of the blood vessels will be attained.

Additionally, in the case of approximating a partial contour of a desired region, a desired image processing would be performed being limited to a part of 3-dimensional stratified region or a 3-dimensional contour-vicinity region.

Non-Patent Document 1: Alex Etienne et al., "Soap-Bubble" (Visualization and Quantitative Analysis of 3D Coronary Magnetic Resonance Angiograms), published by International Society for Magnetic Resonance in Medicine, volume 48, Issue 4, Pages 658-666, October 2002.

Described above is the example of the basic operation for the second embodiment of the region-extraction device relating to the present invention. Though the example described is one of configuring patterned graphics by a plurality of element graphics, one element graphic itself may be used as a patterned graphic. In this case, a contour of a desired region would be approximated through changing the position, size or shape of one element graphic. Also, though the example for extracting the 3-dimensional stratified region or the region including this 3-dimensional stratified region from a plurality of tomographic images was mentioned above, only one tomographic image may be used instead. In this case, 2-dimensional stratified region or the region including this 2-dimensional region would be extracted from one tomographic image. An example for extracting regions such as a 3-dimensional stratified region from a small number of tomographic images will be described later in the fifth and six embodiments.

As described above, according to the second embodiment of the present invention, in addition to the advantageous effects being described in the first embodiment, the extraction of 3-dimensional regions can be further improved in simplicity, time-saving in operation and high accuracy in image processing. Also, an effective image processing with high accuracy becomes possible by limiting the target to a 3-dimensional region. The present invention is especially effective in the case of targeting organs with complicated shapes such as the heart, or obtaining images of blood vessels such as the coronary artery that are running over the surface of a heart.

The Third Embodiment

Next, the third embodiment of region-extracting device and method relating to the present invention will be described.

The present embodiment is for extracting a contour of a desired entire region and the stratified region thereof, by first extracting one or more partial regions being included in a desired region and then combining and synthesizing the respective extracted partial regions. The differences from the previously mentioned second embodiment are that there are no steps S202 and S203 in FIG. 2 because patterned graphics are not used, and the contents of processing in the contour-extracting process in step S204 of FIG. 2 and in the extracting process of stratified regions in step S205. Other than these differences it is the same as the second embodiment. Therefore the present embodiment will be described below focusing on the differences, encoding the parts that are mutually corresponding the second embodiment the same.

The description on the region-extracting device in the third embodiment will be omitted since the configuration of it is the same as the one in the first embodiment shown in FIG. 23. Also, the basic operation example of the region-extracting device in the third embodiment is the same as the flow chart shown in FIG. 2, and as mentioned above, the differences are the processing content of steps S204 and S205 and that there are no steps S202 and S203. Given this factor, the steps of the different processing contents will be described below, taking a heart as an example for the desired region. Hereinafter, the numbers after the hyphen denotes the number of the embodiment.

In step S204-3, after independently extracting the respective one or more partial regions being included in a desired region, by synthesizing at least a part of the desired region using the respective extracted partial regions, at least a partial contour of the desired region being synthesized (a first contour) is obtained. Next, a contour of which the first contour is either enlarged or reduced in size by a predetermined magnification (a second contour) is obtained. The second contour also may be obtained, after enlarging or reducing at least a partial desired region being synthesized, from at least a part of the enlarged or reduced desired region. If the magnification is bigger than 1 the second contour will be outside of the first contour, and if it is smaller than 1 the second contour will be inside of the first contour.

Figure 16:
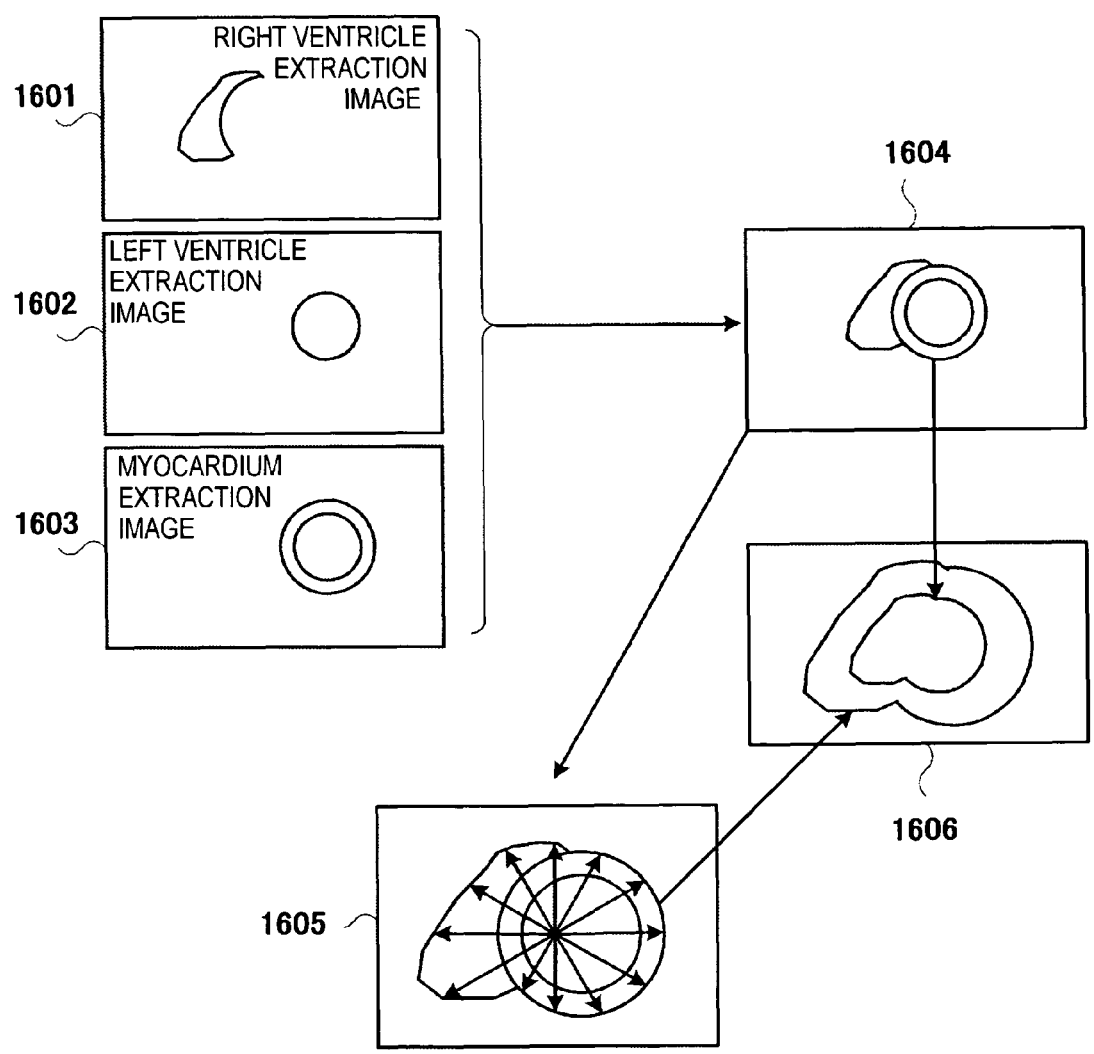
FIG. 16 is a diagram showing an example in the case of automatically extracting cardiac ventricle or cardiac muscle from a tomographic image with gray sale, and obtaining the stratified region using the result of the extraction.

FIG. 16 is a diagram showing an example of the present embodiment, which illustrates an example of extracting partial regions such as ventricles or a myocardium from a cardiac tomographic image with black and white or color imaging and obtaining the stratified region of a whole heart using the result of the extraction. For example, according to the method being disclosed in (Patent Document 2) or (Patent Document 3) formerly applied by the applicant of the present application, as illustrated in FIG. 16, three images that are right ventricle extraction image 1601, left ventricle extraction image 1602, and myocardium extraction image 1603 can be automatically extracted from the tomographic images. By synthesizing these extracted images of the partial regions, image 1604 displaying a contour of the entire desired region (the first contour), that is displaying the outer contour of the whole heart, is obtained (hereinafter referred to as "outer contour image").

Next, for example, enlarged (reduced) outer contour image 1605 is obtained by enlarging or reducing the size of outer contour image 1604 as a seldom-moving point or a gravity point of outer contour image 1604 being a center, and the outer contour thereof (the second contour) is also acquired. Or, the second contour may be obtained through enlarging or reducing the size of the above-mentioned first contour with a predetermined magnification.

Patent Document 1: JP-A-2002-253652
Patent Document 2: JP-A-2003-30575

In the above, an example of automatically extracting the respective partial regions based on the method, for example, being described in (Patent Document 2) or (Patent Document 3), but the extraction may also be implemented using the patterned graphics being described previously in the second embodiment.

In step S205-3, making the region being held between the contour of an entire desired region (the first contour) being obtained in step S204-3 and the enlarged (reduced) contour thereof (the second contour) as a stratified region of the desired region, the region including at least this stratified region is obtained.

In FIG. 16, an example of obtaining stratified region 1606 necessary for performing the image processing for displaying the blood vessel pattern of a cardiac surface in 3-dimensions is illustrated using outer contour 1604. For the extraction of stratified region 1604, the region held between the first contour and the second contour that are obtained in the above-mentioned step S204-3 is extracted.

Figure 2:
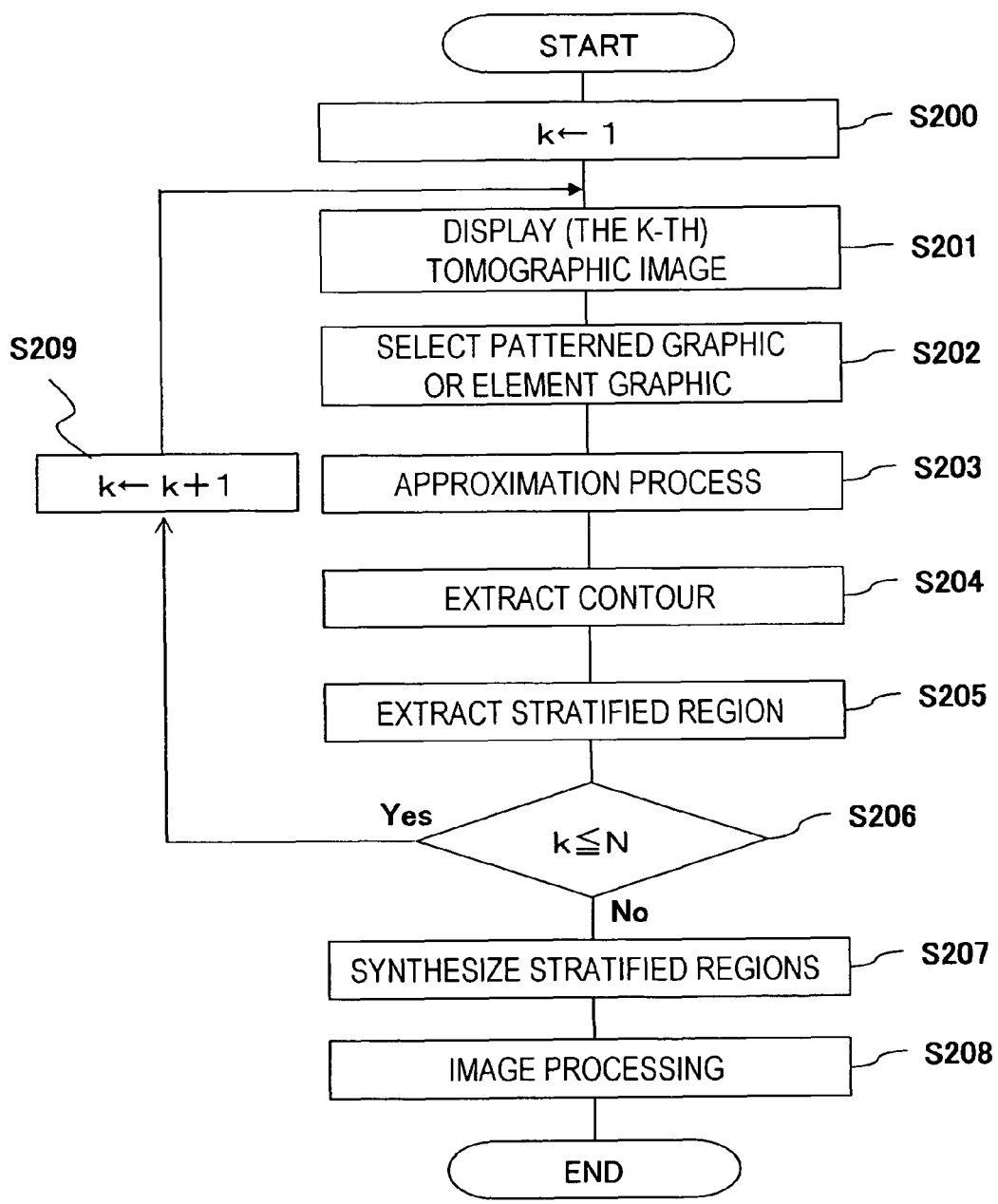
FIG. 2 is a flow chart showing a basic operation example in the second embodiment of the region-extracting device to which the present invention is applied.

The above is a description of the steps different from the basic operation of the second embodiment shown in FIG. 2, and other than steps S202~205 is the same as the basic operation of the second embodiment shown in FIG. 2. In this way, the region including the 3-dimensional stratified region encompassing a desired region or the region including this 3-dimensional stratified region is extracted, and a desired image processing is performed limiting to the 3-dimensional region thereof.

As mentioned above, according to the third embodiment, in addition to the advantageous effects in the first embodiment, it is possible to obtain stratified regions automatically and the extraction process of stratified regions can be implemented easily and quickly. Particularly in the case of targeting organs with a complicated shape such as a heart, burdens of an operator can be reduced by saving the labor such as the complicated setting process required for the conventional region-extraction.

The Fourth Embodiment

Next, the fourth embodiment of the region-extracting device and method relating to the present invention will be described. The present embodiment is for extracting stratified regions, by first extracting one or more partial regions being included in a desired region, synthesizing at least a part of the respective desired regions from the extracted respective partial regions and the partial regions being enlarged (or reduced) with a predetermined magnification, and obtaining contours from at least a part of the desired regions which are two different-sized and synthesized. The differences from the previously mentioned second embodiment are, as is in the previously mentioned third embodiment, that there are no steps S202 and S203 in FIG. 2 because the patterned graphics are not used, and the processing contents in the contour-extracting process in step S204 of FIG. 2 and in the extracting process of stratified regions in step S205. Other than these points the fourth embodiment is the same as embodiment 2. Therefore the present embodiment will be described below focusing on the differences, encoding the parts that are mutually corresponding the second embodiment the same. The description on the region-extracting device in the fourth embodiment will be omitted since the configuration of it is the same as the one in the first embodiment shown in FIG. 23. Also, the basic operation example of the region-extracting device in the third embodiment is the same as the flow chart shown in FIG. 2, but as mentioned above, the differences are the processing content of steps S204 and S205 and that there are no steps S202 and S203. Given this factor, the steps of the different processing contents will be described below, taking a heart as an example for a desired region.

In step S204-4, after independently extracting the respective one or more partial regions being included in a desired region, by synthesizing at least a part of the desired region using the respective extracted partial regions, at least a partial contour of the desired region being synthesized (a first contour) is obtained. Next, the extracted respective partial regions are enlarged (or reduced) with a predetermined magnification, and by using them at least a part of the enlarged (reduced) desired regions are synthesized. At least a partial contour of the enlarged (reduced) desired regions (the second contour) is obtained.

Figure 17:
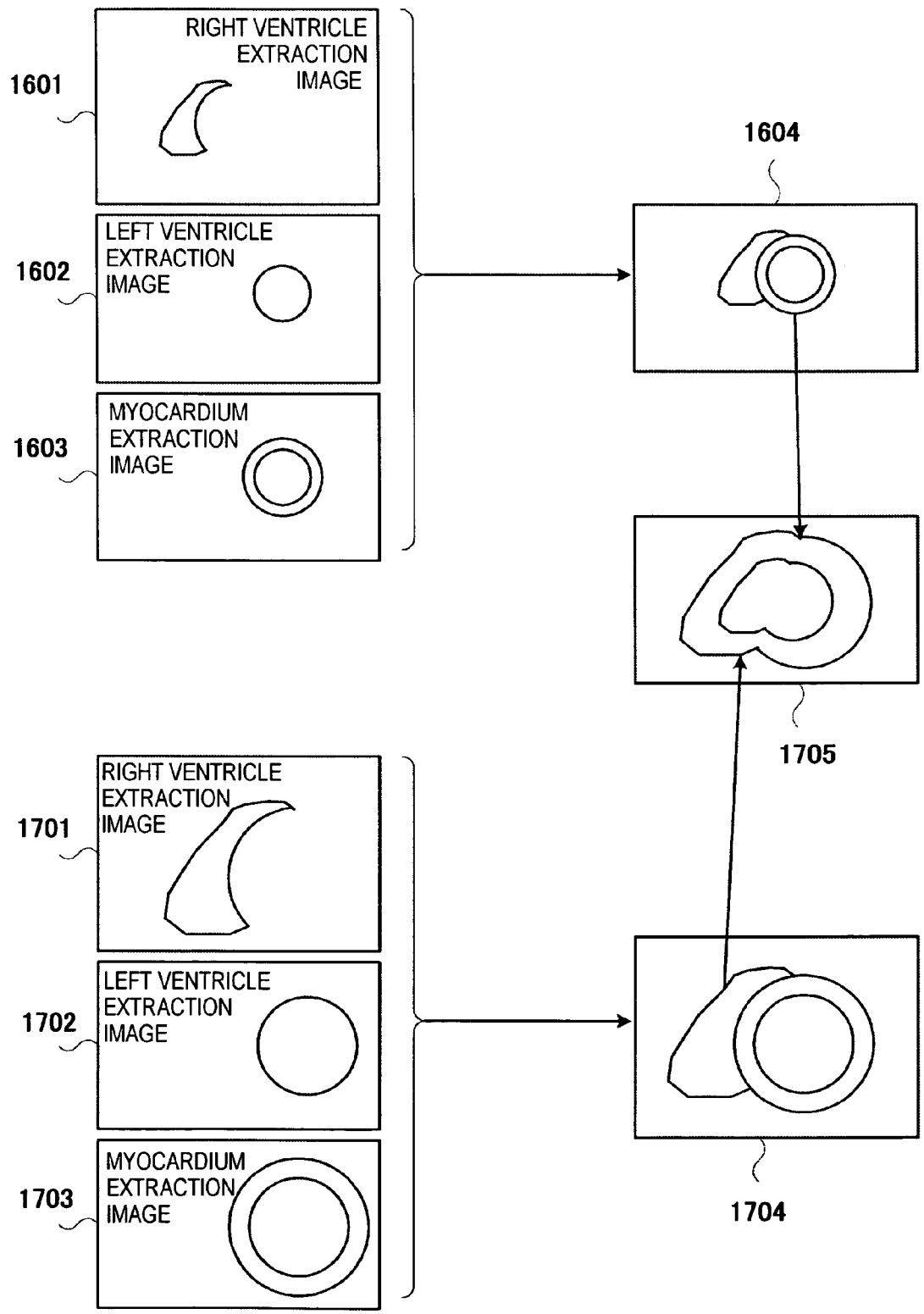
FIG. 17 is a diagram showing another example in the case of automatically extracting cardiac ventricle or cardiac muscle from a tomographic image with black and white or color imaging, and obtaining the stratified region using the result of the extraction.

FIG. 17 is a diagram showing an example of the present embodiment, which illustrates an example of extracting the partial regions such as ventricles or a myocardium from a cardiac tomographic image with black and white or color imaging and obtaining the stratified region of a whole heart using the result of the extraction. For example, according to the method being disclosed in (Patent Document 2) or (Patent Document 3) formerly applied by the applicant of the present application, as illustrated in FIG. 16, three images as shown in FIG. 17 that are right ventricle extraction image 1601, left ventricle extraction image 1602, and myocardium extraction image 1603 can be automatically extracted from the tomographic images. By synthesizing these images of the extracted partial regions, outer contour image 1604 of a heart is obtained. The steps so far are the same as those in the case of FIG. 16. In the fourth embodiment, the extracted three images that are right ventricle extraction image 1601, left ventricle extraction image 1602 and myocardium extraction image 1603 are enlarged (reduced) with the same magnification, and the enlarged (reduced) right ventricle extraction image 1701, left ventricle extraction image 1702 and myocardium extraction image 1703 are respectively obtained. By synthesizing obtained enlarged (reduced) right ventricle extraction image 1701, enlarged (reduced) left ventricle extraction image 1702 and enlarged (reduced) myocardium extraction image 1703, enlarged (reduced) outer contour image 1704 is acquired. The first contour is obtained from the above-mentioned outer contour image 1604 and the second contour is obtained from outer contour image 1704.

In the above, an example of automatically extracting the respective partial regions based on the method, for example, being described in (Patent Document 2) or (Patent Document 3), but the extraction may also be implemented using the patterned graphics being described previously in the second embodiment.

In step S205-4, making the region being held between at least a partial contour of a desired region (the first contour) being obtained in step S204-4 and the enlarged (reduced) contour thereof (the second contour) as a stratified region of the desired region, the region including at least this stratified region is obtained.

In FIG. 17, an example of obtaining stratified region 1705 as a region held between outer contour image 1604 and enlarged (reduced) outer contour image 1704 thereof, that is as the region for performing the image processing for displaying the blood vessel pattern of a cardiac surface in 3-dimensions, is illustrated.

The above is the description on the steps different from the basic operation of the second embodiment shown in FIG. 2, and other than steps S202~205 is the same as the basic operation of the second embodiment shown in FIG. 2. In this way, the 3-dimensional stratified region encompassing a desired 3-dimensional region or the region including this 3-dimensional stratified region is extracted, and a desired image processing is performed limiting to the 3-dimensional region thereof.

As described above, the fourth embodiment of the present invention provides the same advantageous effects as the previously mentioned embodiment 3.

The Fifth Embodiment

Next, the fifth embodiment of the region-extracting device and method relating to the present invention will be described.

The present embodiment is for obtaining contours of a desired region based on the several tomographic images out of the plurality of them, and obtaining contours of the desired region other than those of previously mentioned by interpolation from the contours that are previously obtained (herein after referred as "the first contour-interpolation processing"). Or, in the case there is a spacing between the slices, which means that there is no imaged region between the adjacent slices, it is for obtaining a contour of a desired region in not-imaged regions by interpolation from the contours of the desired regions being extracted based on the tomographic images of the imaged slices (hereinafter referred to as "the second contour-interpolation process"). The difference from the second~fourth embodiment is only the process contents corresponding to the contour-extracting process of step S204 in FIG. 2. Beside it is the same as the second~fourth embodiments. Therefore the present embodiment will be described below focusing on the differences, encoding the parts that are mutually corresponding the second~fourth embodiments the same.

The description on the region-extracting device in the fifth embodiment will be omitted since the configuration of it is the same as the one in the first embodiment shown in FIG. 23. Also, the basic operation example of the region-extracting device in the fifth embodiment is the same as the flow chart shown in FIG. 2, but as mentioned above, the difference is only the processing content of steps S204. Given this factor, the step thereof in the case of the above-mentioned first contour-interpolation process will be described below, taking a heart as an example for a desired region. In the case of the above-mentioned second contour-interpolation process will also be the same.

In step S204-5, one of the above-mentioned first contour-interpolation process or the second contour-interpolation process will be implemented.

Figure 18:
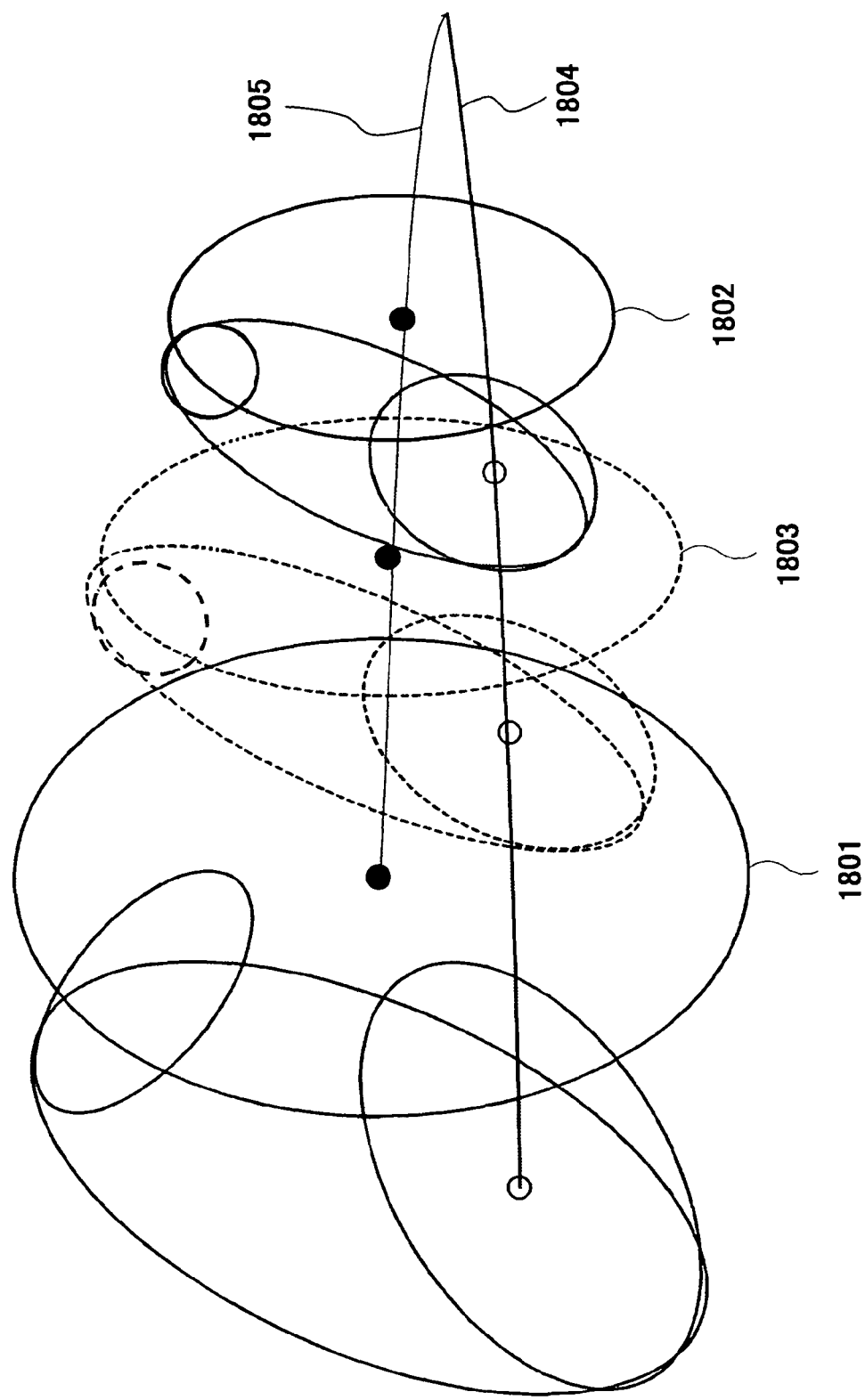
FIG. 18 is a schematic diagram showing an example in the case of obtaining an outer contour by interpolation with regard to the regions where there is no slice tomographic image or the tomographic images among the plurality of tomographic images of which the outer contour has not obtained.

FIG. 18 is a diagram showing an example of applying the above-mentioned first contour-interpolation process corresponding to the three consecutive slice tomographic images (A), (B) and (C) shown in FIG. 6. First, outer contour 1801 (solid line) and outer contour 1802 (solid line) of a heart are extracted with regard to the slice tomographic images of FIG. 6(A) and (C), using the patterned graphic configured by four ellipses as previously mentioned. Next, outer contour 1803 (dotted line) of the heart in the slice tomographic image of FIG. 6(B) is obtained by implementing the linear interpolation process or the spline interpolation process from outer contour 1801 and outer contour 1802. In other words, a contour in the tomographic image between both sides of the tomographic images is obtained, by the interpolation process from the outer contours based on both sides of the tomographic images. In this case, the outer contour can be easily interpolated by implementing the interpolation process on the center position of the four ellipses configuring the outer contour and on the length of the major and minor axis thereof. FIG. 18 is an illustration for obtaining the center position of the ellipses by the interpolation process, using lines 1804 and 1805 respectively connecting the center points of the two ellipses (white circles and black circles).

The above is a description of the steps of the second~fourth embodiments shown in FIG. 2 that are different from the basic operation, and the other steps are the same as the basic operation of the second~fourth embodiments shown in FIG. 2. By the above steps, a 3-dimensional stratified region encompassing a 3-dimensional desired region or the region including this 3-dimensional stratified region are extracted, and the desired image processing is performed limited to these 3-dimensional regions.

As described above, according to the fifth embodiment of the present invention, in addition to the advantageous effects of the first~fourth embodiments, it is possible to save time in carrying out the extraction of 3-dimensional stratified regions. The above-mentioned interpolation process can extract stratified regions in a shorter period of time than the extraction from the tomographic images, thus saving more time compared to the case of obtaining the stratified region of each and all of the slice tomographic image and synthesizing the 3-dimensional stratified images. Also, in the case of extracting contours using the previously mentioned patterned graphics, there is no need for implementing the approximation process on each of the tomographic image, which enables reduction in labor by an operator. Additionally, the same advantageous effects are provided also in the case of the above-mentioned second outer contour interpolation process.

The Sixth Embodiment

Next, the sixth embodiment of the region-extracting device and method relating to the present invention will be described.

The present embodiment is, in the case that there is a spacing between the adjacent slices, which means that there are regions that are not imaged between the adjacent slices, for obtaining a stratified region of a desired region which is not imaged by the interpolation from the stratified region in the desired region being extracted based on the imaged slices of the tomographic images (hereinafter referred to as "the first stratified region interpolation process"). Or, it is for obtaining a stratified region of a desired region based on the several tomographic images out of a plurality of them, and the stratified region of the desired region in the other tomographic images is calculated by the interpolation based on the obtained stratified region (hereinafter referred as "the second stratified region interpolation process"). The difference between the second~fourth embodiments is only the process contents for the synthesizing process of the stratified regions in the step S207 of FIG. 2. The other steps are the same as those of the second~fourth embodiments. Therefore the present embodiment will be described below focusing on the differences, encoding the parts that are mutually corresponding the second~fourth embodiments the same.

The description of the region-extracting device in the sixth embodiment will be omitted since the configuration of it is the same as the one in the first embodiment shown in FIG. 23. Also, the basic operation example of the region-extracting device in the third embodiment is the same as the flow chart shown in FIG. 2, and the differences is only the processing content of step S207 as mentioned above. Given this factor, this step in the case of the above-mentioned first or second stratified region interpolation process will be described below, taking a heart as an example for a desired region.

In S207-6, either the above-mentioned first stratified region interpolation process or the second stratified region interpolation process is implemented.

Figure 19:
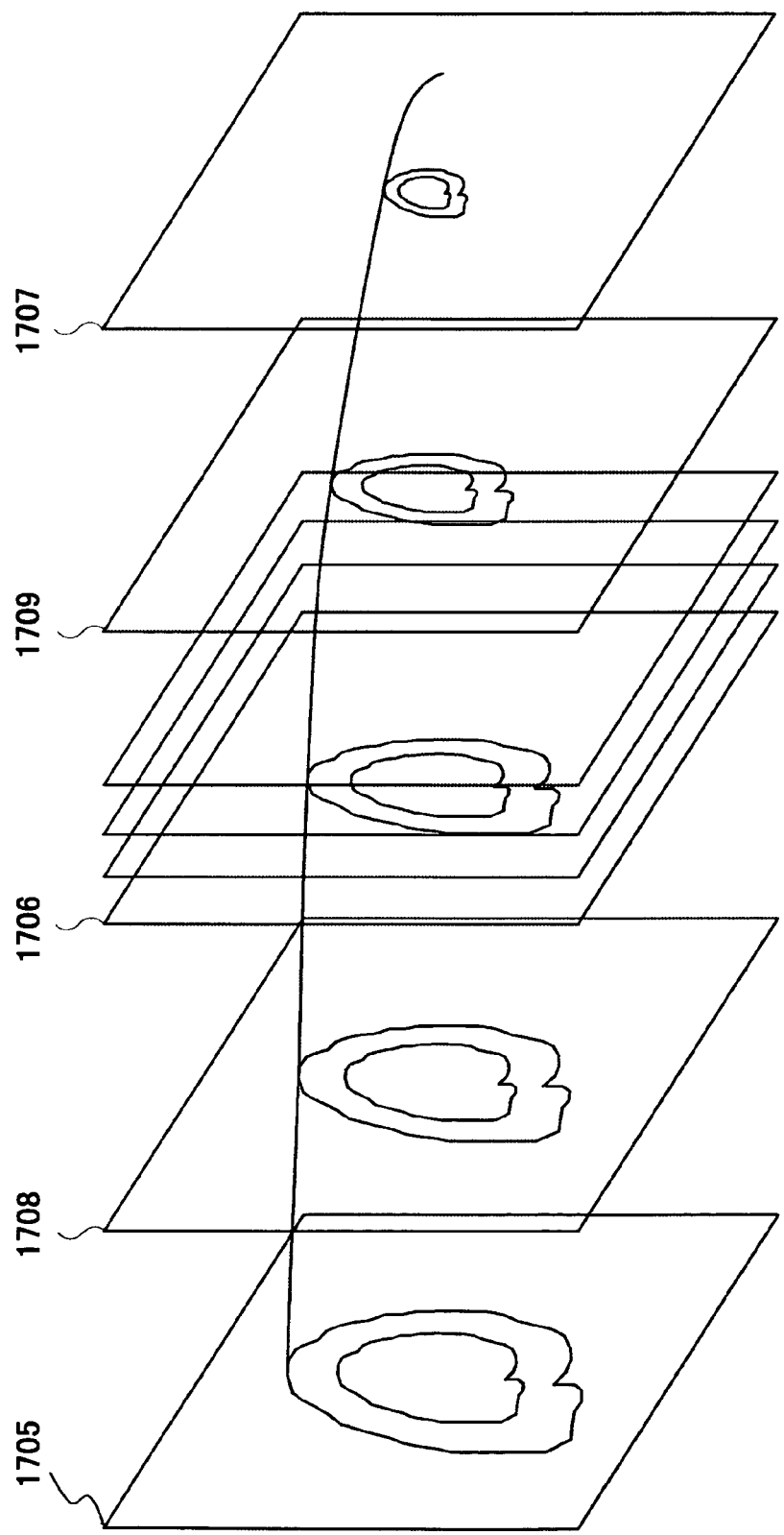
FIG. 19 is a schematic diagram showing an example in the case of obtaining the stratified region by interpolation with regard to the regions where there is not slice tomographic images or the tomographic images among the plurality of tomographic images of which the stratified region is not obtained.

FIG. 19 is a schematic diagram of an example of the above-mentioned first or the second stratified region interpolation process. Here, stratified regions of a heart where there is no slice tomographic image, are obtained by implementing the linear interpolation process or the spline interpolation process from the respective stratified regions being obtained in the respective slices of tomographic images (the first stratified interpolation process). Or, stratified regions of a desired region are obtained based on several tomographic images out of a plurality of them, and as for stratified regions of the desired region in the other tomographic images, the interpolation process is used (the second stratified region interpolation process).

For example, in the case of having stratified regions 1705~1707 being extracted by the process in FIG. 16 or FIG. 17, stratified region 1708 which is between stratified regions 1705 and 1706 and stratified region 1709 between stratified regions 1706 and 1707 can be obtained by implementing the linear interpolation process or the spline interpolation process from these stratified regions 1705~1707.

In other words, for the regions with no tomographic images, it is possible to obtain stratified regions by implementing the interpolation process from the stratified region of both sides of the regions thereof (the first stratified region interpolation process). Or, a stratified region of a desired region can be obtained based on several tomographic images out of a plurality of them, and as for the stratified region of the desired region in the other tomographic images, the stratified region in the tomographic image of which the actual stratified region could not be obtained can be acquired through the interpolation process from the stratified region of both sides of the tomographic image (the second stratified region interpolation process).

The above is the description on the step being different from the basic operation of the second embodiment shown in FIG. 2, and the other steps are the same as the basic operation of the second embodiment shown in FIG. 2. By these steps, a 3-dimensional stratified region encompassing a 3-dimensional desired region or the region including this 3-dimensional stratified region are extracted, and the desired image processing is performed by limiting to these 3-dimensional regions.

As described above, according to the sixth embodiment of the present invention, the same advantageous effects are provided as those of the previously mentioned fifth embodiment.

The Seventh Embodiment

Next, the seventh embodiment of the region-extracting device applied to the present invention will be described. In the present embodiment at least one of the previously mentioned second~sixth embodiments is included, and processes such as manual contour extraction or extraction of stratified regions are further added. Thus the present embodiment will be described focusing on the differences between the previously mentioned second~sixth embodiments. The parts that are mutually corresponding to the second~sixth embodiments will be omitted, by encoding them the same.

The description on the configuration of the region-extracting device in the seventh embodiment will be omitted since it is the same as the one in the first embodiment shown in FIG. 23.

Figure 20:
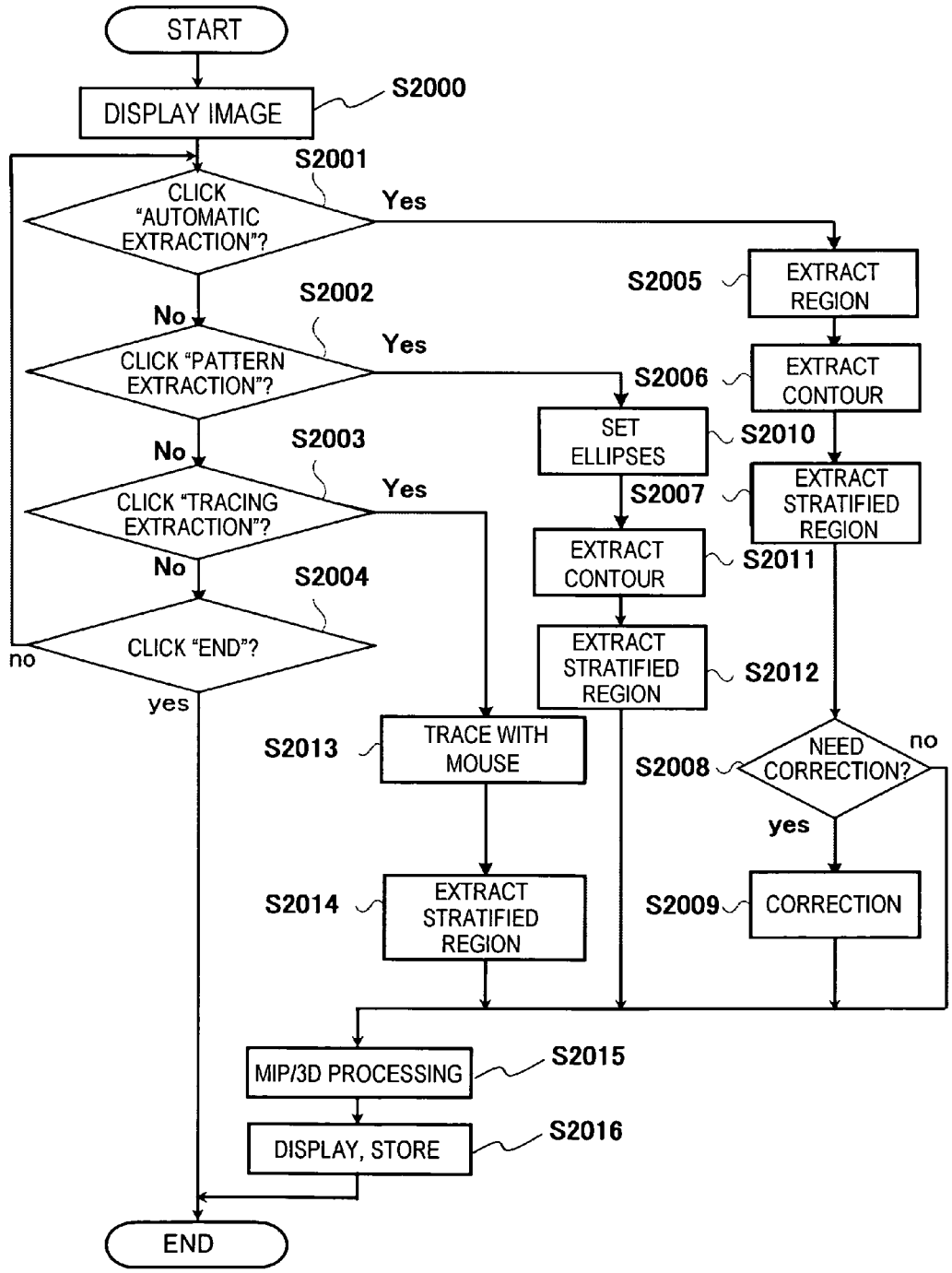
FIG. 20 is a diagram showing an example of a main flow being executed by the region-extracting device of the seventh embodiment.

FIG. 20 is a diagram showing an example of the main flow carried out by the region-extraction device. CPU 10 is operated according to this main flow. Below is the detailed description of this main flow in order of steps, taking a heart as an example for a desired region.

In step S2000, an image including the target region for contour extraction is displayed on the display device. In concrete terms, image data such as X-ray CT image is read out from, for example, magnetic disk 12 and displayed to CRT 14 shown in FIG. 23.

An example of an image display is illustrated in FIG. 21. For example, tomographic image 2101 with black and white or color imaging such as X-ray CT is displayed on the left side of the screen, and menu 2102 for selecting means to extract a contour of the desired area (region) from tomographic 2101 is displayed on the right side of the screen.

In steps S2001~S2003, a means for extracting a stratified region encompassing the desired area (region) is selected.

FIG. 21 is a diagram, illustrating the case of extracting the stratified region from the tomographic image with black and white or color imaging, showing an example of an image for selecting the means on how to extract the stratified region. As seen in the example of FIG. 21, icon menu 2102 for selecting a means is displayed on the right side of tomographic image 2101. Here, a method for automatically extracting stratified regions as respectively described in the previously mentioned third and fourth embodiments and illustrated in FIGS. 16 and 17 is denoted as "automatic extraction", a method for extracting the stratified region using the patterned graphics as described in the previously mentioned second embodiment referring FIGS. 2~15 is denoted as "patterned extraction", and a method for extracting stratified regions by manually tracing in the conventional way is denoted as "manual tracing extraction". When icon 2103 of the "automatic extraction" is clicked with a device such as mouse 15, a ventricle or myocardium of a heart is automatically extracted from a tomographic image being displayed. The description on the method for the automatic extraction is omitted here since it is described in detail in (Patent Document 2) or (Patent Document 3) being previously applied by the applicant of the present application.

In step S2001, the determination on whether "automatic extraction" is selected or not is conducted.

In this step, whether icon 2103 of "automatic extraction" is clicked with a device such as mouse 15 or not is determined, and if the answer is "yes" step S2005 is carried out and if "no" next step S2002 is carried out.

In step S2002, the determination on whether "pattern extraction" is selected or not is conducted.

In this step, whether icon 2104 for "pattern extraction" is clicked with a device such as mouse 15 is determined, and if the answer is "yes" step S2010 is carried out and if "no" next step S2003 is carried out.

In step S2003, the determination on whether "manual tracing extraction" is selected or not is conducted.

In this step, whether icon 2105 of "manual tracing extraction" is clicked with a device such as mouse 15 is determined, and if the answer is "yes" step S2013 is carried out and if "no" next step S2004 is carried out.

In step S2004, the determination on whether "end" is selected or not is conducted.

In this step, whether icon 2106 of "end" is clicked with a device such as mouse 15 is determined, and if the answer is "yes" the process is ended and if "no" the step is returned to S2001.

In step S2005, upon icon 2103 for "automatic extraction" is being selected, a region such as a ventricle or myocardium of a heart is automatically extracted from a tomographic image with black and white or color imaging which is being displayed, by a method described in (Patent Document 2) or (Patent Document 3) being applied by the applicant of the present application.

In step S2006, an outer contour image is obtained using extracted regions such as a ventricle or myocardium of a heart, by the method being illustrated in FIG. 16 or FIG. 17. Then the first contour and/or the second contour is obtained.

In step S2007, stratified regions are extracted using the extracted outer contour image or the extracted partial regions such as a ventricle or myocardium of a heart, by the method being illustrated in FIG. 16 or FIG. 17.

In step S2008, whether the operator had indicated the manual correction or not is determined, if manual correction is instructed (yes) step S2009 is carried out, and if not indicated (no) step S2015 is carried out.

In step S2009, upon manual correction had been instructed by the operator, the correction of the stratified region is implemented using a pointing device such as mouse 15. The correction of stratified regions can be executed by correcting, for example, the outer contour image being obtained in step S2006.

Figure 22:
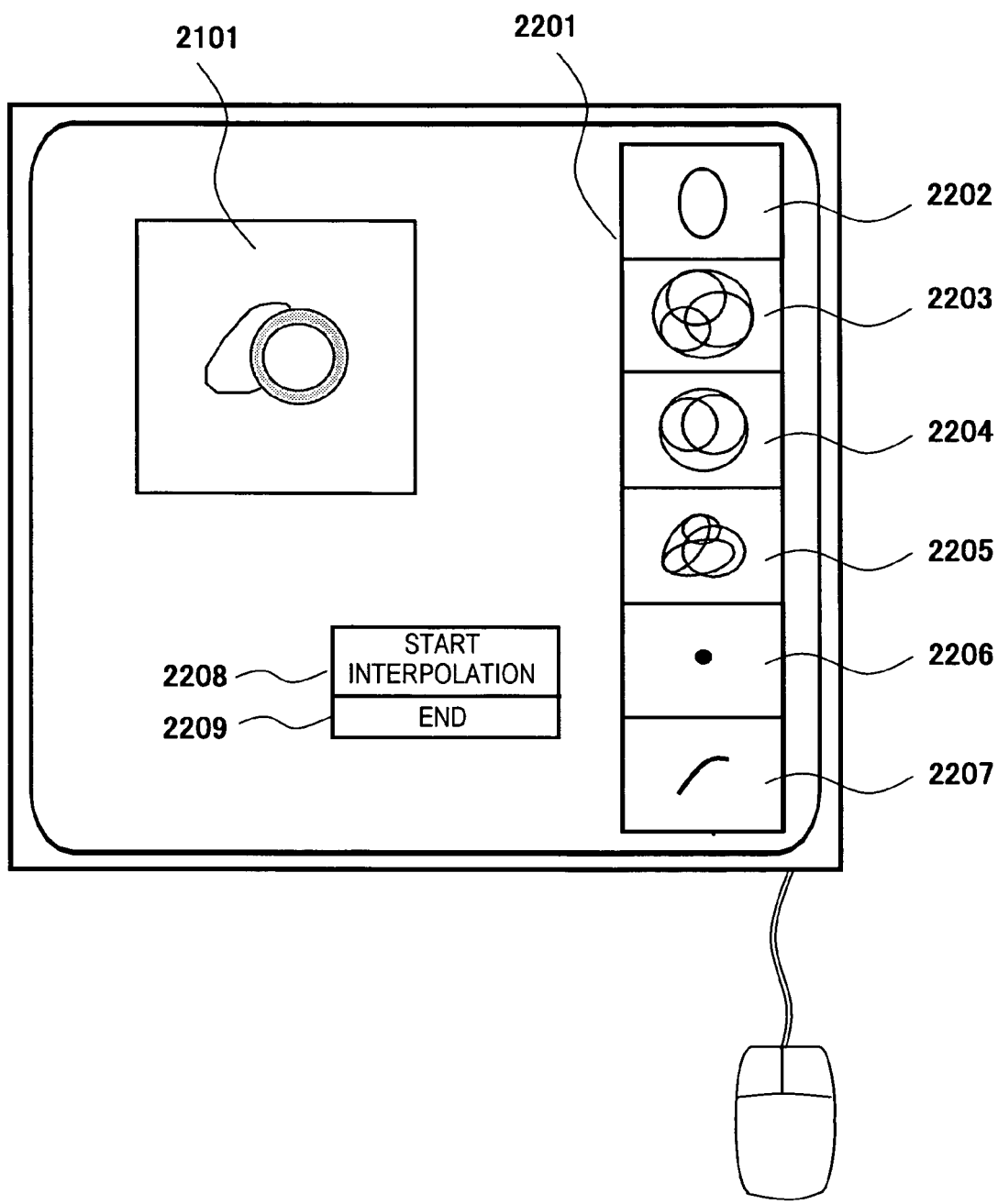
FIG. 22 is a diagram displaying an example of a menu list for selecting the patterned graphics in the case of an icon of "extract patterns" being selected as an extracting method for a specified region.

In step S2010, upon icon 2104 of "pattern extraction" is being selected with a device such as mouse 15 and the image being set with a patterned graphic configured by icon menu 2201 for selecting the patterned graphics as seen in FIG. 22 is displayed, an operator selects a patterned graphic for approximating by clicking these icons with a pointing device such as mouse 15.

FIG. 22 is a diagram displaying an example in the case of icon 2104 for "pattern extraction" is selected as an extracting method of tomographic images. By icon 2104 for "pattern extraction" being selected, icon menu 2201 for selecting the patterned graphics corresponding to the patterned graphics for approximating contours is displayed on the part where icon 2102 for selecting the extraction method was being displayed.

The function that icons 2202~2207 in icon menu 2201 for selecting the patterned graphics is described below.

Icon 2202 is for additionally displaying ellipses that are element graphics one at a time and approximating a partial contour of a desired region, and also for approximating a contour by the first procedure being described in steps S202 and S203 of FIG. 2. By clicking this icon using a pointing device such as mouse 15, one element graphic is displayed. Icon 2203 is for carrying out the method to approximate by using the four ellipses shown in FIGS. 10 and 11. Icon 2204 is for carrying out the method to approximate by using three ellipses shown in FIGS. 6 and 7. Icon 2205 is for carrying out the method to approximate using four ellipses shown in FIGS. 3~5, 9 and 13.

Icon 2206 is for placing a plurality of points on a contour and displaying the patterned graphics or element graphics passing through those points or the vicinity of them as shown in FIG. 5(a), and also for approximating a contour by the second procedure previously described in steps S202 and S203.

Icon 2207 is for placing one or more curves on the contour and displaying the pattern graphics or element graphics passing through those curves or the vicinity of them as shown in FIG. 5(b), and also for approximating a contour by the second procedure previously described in steps S202 and S203.

By selecting the most appropriate icon from icon menu 2201 for selecting the patterned graphics being configured with the above-mentioned icons, contour extraction of a desired region on a tomographic image is executed based on the function corresponding to the selected icon.

Icons 2203~2205 of the patterned graphics and other icons 2202, 2206 and 2207 may be separated and displayed as a menu of additional group.

In step S2011, upon an image with a setting of a plurality of ellipses as seen in FIGS. 3~6, FIG. 7, FIGS. 9~11 and FIG. 13 is being displayed according to the selected icons for selecting patterned graphics, the extraction of a cardiac outer contour (the first contour) and a contour based on it (the second contour) is executed. This step is equivalent to steps S203 and S204 in FIG. 2.

Also, as shown in FIG. 22, icon 2208 for "starting interpolation" is displayed near the center of a screen, and the interpolation process as seen in FIG. 18 is started as the need arises by clicking the icon with a device such as mouse 15.

When the extraction is ended, icon 2209 for "end" is clicked with a device such as mouse 15 and then step S2012 is carried out.

In step S2012, a stratified region is extracted using a method as shown in FIG. 13. This step is equivalent to step S205 in FIG. 2.

When there is a plurality of slice tomographic images, after repeating the above-mentioned steps S2010~2012, the synthesis of the stratified regions which is equivalent to step S207 in FIG. 2 takes place in this step S2012. The interpolation process such as in FIG. 19 may be performed at this time.

In step 2013, upon icon 2015 for "tracing extraction" is being selected with a device such as mouse 15, a sample point is inputted on the display screen using a pointing device such as a mouse, trackball, or light pen, and a cardiac outer contour (the first contour) is extracted by manual tracing. Also, a contour (the second contour) is obtained based on the first outer contour. For obtaining this second contour, the same method can be used as the one in the previously mentioned first embodiment.

In step S2014, a stratified region is extracted by the method as shown in FIG. 13. When there is a plurality of slice tomographic images, after repeating the above-mentioned step S2013, the synthesis of the stratified regions that equals step S207 in FIG. 2 takes place in this step S2012. At this time, the processing time may be shortened by reducing the number of slice tomographic images for implementing the tracing process, by using the interpolation process shown previously in FIG. 18 or FIG. 19.

In step S2015, MIP/3D process is implemented with regard to the stratified region being extracted by the respective above-mentioned steps.

In step S2016, an image being obtained by MIP/3D process is displayed on the screen.

As described above, according to the seventh embodiment of the present invention, in addition to the advantageous effects of the first~six embodiments, the need for the extraction of even more complicated or different shapes of organs or regions can be responded with flexibility, by providing a plurality of patterned graphics in advance. Also, each means of contour-extraction, such as automatic or manual extraction, or contour-approximation using patterned graphics, has merits and demerits in its own region-extracting characteristics, hence providing them all would enable an operator to select an appropriate method for region-extracting corresponding to the diversity of shapes of organs or regions, or image quality of the tomographic images.

Each embodiment of the present invention had been described above, and the region-extracting device and method relating to the present invention is applicable not only to an image obtained by an X-ray CT device, but also to the image obtained by other devices such as magnetic resonance imaging or an ultrasound device. Also, not only a heart but many other organs or regions of the body can be a target region. The present invention is applicable not only to medical images but also to region-extraction in other commonly used images.

Moreover, patterned graphics were classified by the kind of lines such as dotted lines or dashed lines in the respective previously mentioned embodiments, but they can be classified also by the colors of lines such as read, blue or green, or the thickness of lines such as thin lines and thick lines.

Also, though an example of setting the region held between the first contour and the second contour by which the first contour is either enlarged or reduced as a stratified region was described, but the region held between the region by which the first contour itself is either enlarged or reduced and the second contour may also set as a stratified region.

The invention claimed is:

1. A region extraction method, by an image processing apparatus, for extracting a specified region in an image, the method including the steps of:
   (a) displaying the image;
   (b) selecting a desired region in the image;
   (c) selecting an element graphic corresponding to at least a partial contour of a partial region in the desired region;
   (d) approximating at least a rectifiable partial contour of the selected element graphic to at least said partial contour of the partial region;
   (e) repeating the steps (c) to (d) at least twice, so that at least two selected element graphics overlap with each other; and
   (f) making a first closed contour by combining at least said rectifiable partial contour of the respective element graphics after the approximation;
   (j) obtaining, by the image processing apparatus, a second closed contour similar to the first closed contour by enlarging or reducing the first closed contour; and
   (k) extracting, by the image processing apparatus, a region including a stratified region held between the first closed contour and the second closed contour.

2. The region extraction method according to claim 1, wherein the step (c) is for selecting the element graphics passing through a plurality of points being placed on at least a partial contour of the partial region or the vicinity of them.

3. The region extraction method according to claim 1, wherein the step (c) is for selecting the element graphics passing through one or more curves being placed on at least a partial contour of the partial region or the vicinity of them.

4. The region extraction method according to claim 1, wherein at least either size or shape of two or more of the plurality of element graphics is different from one another.

5. The region extraction method according to claim 1, characterized in that a shape of the element graphic is an ellipse.

6. The region extraction method according to claim 5, wherein the approximation is performed in step (d) by changing the position, size or shape of the ellipse by moving the major axis point, minor axis point or center point of the ellipse or rotating the ellipse around the center point.

7. The region extraction method according to claim 5, wherein the approximation is performed in step (d) by mutually interlocking at least two ellipses.

8. The region extraction method according to claim 1, wherein the step (c) is for displaying the element graphic with the image, and step (d) is for implementing the approximation of the displayed element graphics on the image.

9. The region extraction method according to claim 1, wherein the following steps are included between the step (b) and the step (c):

(g) a step for displaying at least one patterned graphic formed by a plurality of element graphics being combined;
(h) a step for selecting the one patterned graphic corresponding to the desired region;
(i) a step for displaying at least one of the plurality of element graphics configuring the selected patterned graphic along with the image, and in the step (c), the selection of an element graphic from the displayed element graphics is implemented.

10. The region extraction method according to claim 1, wherein the step (j) is for obtaining the second contour by changing a position, size or shape of the element graphics that are used upon obtaining the first contour in the step (f).

11. The region extraction method according to claim 1, wherein the step (k) is for extracting one of only the stratified regions, a region on the side of the first contour including the stratified region or a region on the side of the second contour including the stratified region.

12. The region extraction method according to claim 1, in the case there is a plurality of images, wherein the following steps are included after the step (k):
    (u) a step for changing the image and repeating the steps (a)-(k) at least twice;
    (v) a step for synthesizing 3-dimensional regions using the extraction region on each of the images.

13. The region extraction method according to claim 12, in the case that the plurality of images are tomographic images being mutually different slices, wherein the following step is included between the steps (u) and (v):
    (w) a step for obtaining the first contour, the second contour and the stratified region, of the region where the first contour was not able to be obtained, based on the first contour in the slice of which the first contour was able to be obtained.

14. The region extraction method according to claim 12, in the case that the plurality of images are the tomographic images being mutually different slices, wherein the following step is included between the steps (u) and (v):
    (x) a step for obtaining the stratified region of the region where the stratified region was not obtained, based on the stratified region in the slice of which the stratified region was obtained.

15. A region extraction method, by an image processing apparatus, for extracting a specified region in an image, the method including the steps of:

(l) displaying the image;
(m) selecting a desired region in the image;
(n) extracting, by the image processing apparatus, a plurality of partial regions from the desired region;
(o) combining the plural partial regions and synthesizing at least parts of the desired region; and
(p) making at least a rectifiable partial contour of the synthesized region as a first closed contour;
(q) enlarging or reducing one or more partial regions with a predetermined magnification;
(r) combining the one or more enlarged or reduced partial regions, and synthesizing at least a part of a desired region being enlarged or reduced;
(s) making at least, a partial contour of at least a part of the enlarged or reduced desired region similar to the first closed contour as a second closed contour;
(t) extracting, by the image processing apparatus, a region including at least a stratified region held between the first closed contour and the second closed contour.

16. A region extraction device comprising:
a display means for displaying an image, and displaying a plurality of element graphics along with the image;
an input means for receiving a selection of a desired region in the image and a selection of an element graphic corresponding to at least a partial contour of a partial region in the desired region, the input means receiving at least two selections of element graphics;
a calculating means for executing a desired image processing relating to the image, wherein:
the calculating means, for each of the at least two selected element graphics, approximates at least a rectifiable partial contour of the selected element graphics to at least a partial contour of the desired region, so that at least two selected element graphics overlap with each other,
the calculation means makes a first closed contour by combining at least said rectifiable partial contour of the respective element graphics after the approximation, obtains a second closed contour similar to the first closed contour by enlarging or reducing the first closed contour, and
extracts a region including at least a stratified region held between the first closed contour and the second closed contour.

* * * * *